US012368659B2

(12) United States Patent
Srinivasan et al.

(10) Patent No.: US 12,368,659 B2
(45) Date of Patent: Jul. 22, 2025

(54) METHODS AND SYSTEMS FOR ORCHESTRATING NETWORK FLOW TRACING WITHIN PACKET PROCESSING PIPELINES ACROSS MULTIPLE NETWORK APPLIANCES

(71) Applicant: Pensando Systems Inc., Milpitas, CA (US)

(72) Inventors: Vijay Srinivasan, Santa Clara, CA (US); Sarat Kamisetty, Fremont, CA (US); Krishna Doddapaneni, Cupertino, CA (US); John Cruz, San Jose, CA (US); Loganathan Nallusamy, Bengaluru (IN)

(73) Assignee: Pensando Systems Inc., Milpitas, CA (US)

( * ) Notice: Subject to any disclaimer, the term of this patent is extended or adjusted under 35 U.S.C. 154(b) by 250 days.

(21) Appl. No.: 17/463,256

(22) Filed: Aug. 31, 2021

(65) Prior Publication Data
US 2023/0064845 A1    Mar. 2, 2023

(51) Int. Cl.
*H04L 43/10* (2022.01)
*H04L 41/0894* (2022.01)
*H04L 41/12* (2022.01)
*H04L 43/026* (2022.01)
*H04L 49/00* (2022.01)

(52) U.S. Cl.
CPC ............. *H04L 43/10* (2013.01); *H04L 41/12* (2013.01); *H04L 49/3063* (2013.01)

(58) Field of Classification Search
CPC ........ H04L 43/10; H04L 41/12; H04L 49/3063
See application file for complete search history.

(56) References Cited

U.S. PATENT DOCUMENTS

| 10,594,630 B1* | 3/2020 | Bosshart | ............... H04L 45/745 |
| 10,911,583 B1* | 2/2021 | Zagalsky | ............. H04L 69/324 |
| 11,245,778 B1 | 2/2022 | Bosshart | |

(Continued)

OTHER PUBLICATIONS

Van Renesse, Robbert et al. "Chain Replication for Supporting High Throughput and Availability", OSDI'04: Proceedings of the 6th conference on Symposium on Operating Systems Design & Implementation—vol. 6, Dec. 2004, 14 pgs.

(Continued)

*Primary Examiner* — Xuan Lu

(57) ABSTRACT

An orchestrator can send trace directives to network appliances that indicate a network flow to trace. The network appliances can include packet processing pipelines that each include numerous processing stages. The network appliances implement network rules for processing network flows by configuring the pipeline's processing stages to execute specific policies for specific network packets in accordance with the network rules. The processing stages can also be configured to produce metadata indicating the policies implemented at each stage to process certain network packets in network flows indicated by trace directives. The metadata can be used to produce a trace report that indicates a network packet of the network flow, a first network rule that was applied to the network packet by a one of the first appliance processing stages, and the one of the first appliance processing stages that applied the first network rule to the network packet.

18 Claims, 18 Drawing Sheets

(56) References Cited

U.S. PATENT DOCUMENTS

| | | | |
|---|---|---|---|
| 2012/0166637 A1 | 6/2012 | White, Jr. et al. | |
| 2017/0034058 A1* | 2/2017 | Sampath | H04L 12/6418 |
| 2019/0191004 A1* | 6/2019 | Nakagoe | H04L 67/5683 |
| 2021/0144091 A1* | 5/2021 | C H | H04L 41/40 |
| 2021/0320842 A1* | 10/2021 | Pfosi | H04L 41/082 |
| 2021/0409487 A1* | 12/2021 | Pi | H04L 12/66 |
| 2022/0038368 A1* | 2/2022 | Shen | H04L 45/02 |
| 2022/0109626 A1 | 4/2022 | Wang et al. | |
| 2022/0329505 A1* | 10/2022 | Malhotra | G06F 9/5077 |

OTHER PUBLICATIONS

Terrace, Jeff et al. "Object Storage on CRAQ: High-throughput chain replication for read-mostly workloads", Jan. 2009, 16 pgs.
Foschiano, M. et al. "Cisco Systems' Encapsulated Remote Switch Port Analyzer (ERSPAN)", Cisco Systems Feb. 2017, 17 pgs.
p4.org, "P416 Language Specification", version 1.2.2, May 17, 2021, 170 pgs.
p4.org, "P4 Language Tutorial", 2017, 55 pgs.
Sivaraman, Anirudh et al. "DC.p4: Programming the Forwarding Plane of a Data-Center Switch", 2015, 8 pgs.
Non-Final Office Action, U.S. Appl. No. 17/463,202; (Dec. 9, 2022) 20 pages.
Final Office Action, U.S. Appl. No. 17/463,202; (May 8, 2023) 12 pages.

* cited by examiner

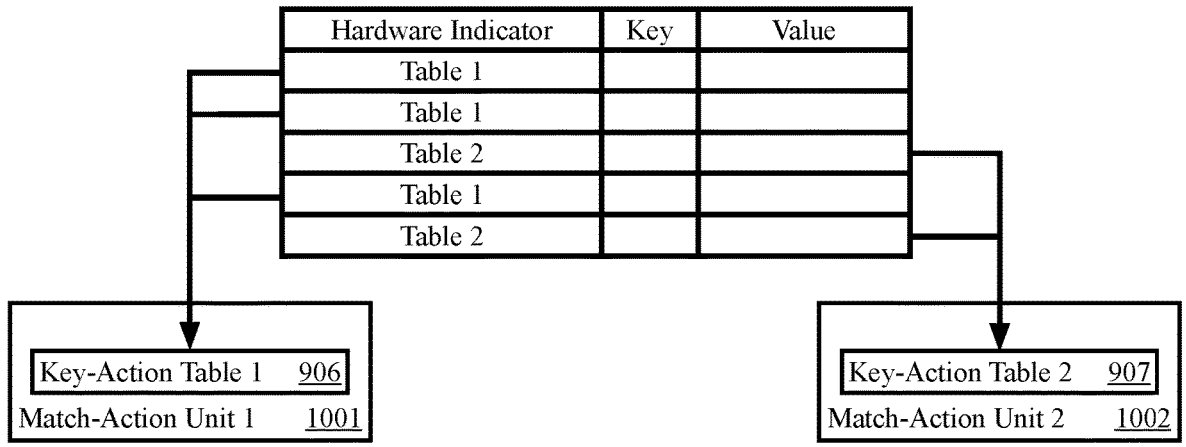

FIG. 10

| Policy Indicator | Policy Inputs |
|---|---|
| SetDropFlag | <empty> |
| SetDropFlag_debug_v1 | hardware_id, policy_id |
| SetDropFlag_debug_v2 | <empty> (hardware_id = MPU ID; policy ID = policy indicator) |
| WriteDestIP | <destination IP address> |
| WriteDestIP_debug | <destination IP address> |
| WriteDestMAC | <MAC address for next hop> |
| WriteDestMAC_debug | <MAC address for next hop> |
| SetDebugFlag | <empty> |
| SetDebugField | <empty> |
| NoOperation | <empty> |
| NoOperation_debug | <policy_id> (hardware_id = MPU ID |
| ⋮ | ⋮ |
| | |

FIG. 11

METHODS AND SYSTEMS FOR ORCHESTRATING NETWORK FLOW TRACING WITHIN PACKET PROCESSING PIPELINES ACROSS MULTIPLE NETWORK APPLIANCES

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, application specific integrated circuits implementing packet processing pipelines, and to tracing the processing of network traffic flows by the processing stages of packet processing pipelines.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances is currently defined in the "$P4_{16}$ Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include sending a trace directive that indicates a network flow to a first network appliance that includes a first packet processing pipeline that includes a plurality of first appliance processing stages, and producing a trace report. The trace report can indicate a network packet of the network flow, a first network rule that was applied to the network packet by a one of the first appliance processing stages, and the one of the first appliance processing stages that applied the first network rule to the network packet.

Another aspect of the subject matter described in this disclosure can be implemented by a system. The system can include a plurality of network appliances that each includes a packet processing pipeline that includes a plurality of processing stages, and a report assembler that is configured to assemble a trace report that includes a plurality of processing descriptions in association with a network packet, wherein the network appliances implement a plurality of network rules, one of the processing stages applies one of the network rules to the network packet, and one of the processing descriptions indicates the network packet, the one of the network rules applied to the network packet by the one of the processing stages, and the one of the processing stages that applied the one of the network rules to the network packet.

Yet another aspect of the subject matter described in this disclosure can be implemented by a system. The system can include a plurality of network appliances that implement a plurality of network rules using a plurality of packet processing pipelines that each includes a plurality of processing stages, a means for tracing a network flow that includes a network packet that is processed by at least two of the network appliances, and a reporting means for reporting which ones of the processing stages applied which ones of the network rules to the network packet.

In some implementations of the methods and devices the first packet processing pipeline is configured to implement the first network rule, the trace directive causes the first network appliance to configure the first packet processing pipeline to produce a first metadata while processing the network packet, the first metadata includes a first hardware identifier that indicates the one of the first appliance processing stages, the first metadata includes a first policy identifier that indicates a first policy applied to the network packet by the one of the first appliance processing stages, and the first hardware identifier and the first policy identifier are used to identify the first network rule.

In some implementations of the methods and devices, the method includes receiving a first metadata from the first network appliance, and using the first metadata and a first configuration map to identify the first network rule, wherein the first configuration map indicates a mapping of a plurality of first appliance network rules to the first appliance processing stages. In some implementations of the methods and devices, the method includes receiving a second metadata from a second network appliance that includes a second packet processing pipeline that includes a plurality of second appliance processing stages, and using the second metadata and a second configuration map to identify a second network rule that one of the second appliance processing stages applied to the network packet, wherein the trace report indicates the second network rule and the one of the second appliance processing stages that applied the second network rule to the network packet.

In some implementations of the methods and devices, the method includes receiving a first trace report from the first network appliance, receiving a second trace report from a second network appliance that includes a second packet processing pipeline that includes a plurality of second appliance processing stages, and assembling the trace report from the first trace report and the second trace report, wherein the trace report indicates a second network rule and the one of the second appliance processing stages that applied the second network rule to the network packet.

In some implementations of the methods and devices, the network packet is a debug packet generated by the first network appliance in response to receiving the trace directive. In some implementations of the methods and devices, the debug packet is transmitted to a second network appliance that includes a second packet processing pipeline that includes a plurality of second appliance processing stages, and the trace report indicates a second network rule and the one of the second appliance processing stages that applied the second network rule to the debug packet. In some implementations of the methods and devices, the debug packet is transmitted to a third network appliance, and the trace report does not indicate a processing stage of a third packet processing pipeline of the third network appliance. In some implementations of the methods and devices, the trace report indicates that the third network appliance processed the debug packet. In some implementations of the methods and devices, the trace report indicates that the network packet passed from the first network appliance to the third network appliance and from the third network appliance to the second network appliance. In some implementations of the methods and devices, the third network appliance is configured to drop the debug packet.

In some implementations of the methods and devices, the first packet processing pipeline is a special purpose packet processing pipeline circuit.

In some implementations of the methods and devices, the network appliances send the processing descriptions to the report assembler. In some implementations of the methods and devices, the system includes a trace orchestrator that is configured to receive a flow trace instruction that indicates at least one network flow, and send a plurality of trace directives to the network appliances in response to receiving the flow trace instruction. In some implementations of the methods and devices, the network appliances are configured to produce a metadata in response to receiving the trace directives, the metadata includes a plurality of hardware identifiers in association with a plurality of policy identifiers, the plurality of hardware identifiers and the plurality of policy identifiers are used to identify the network rules applied to the network packet by the processing stages. In some implementations of the methods and devices, the report assembler is configured to receive the metadata from the network appliances, and use the metadata and a plurality of configuration maps to produce the processing descriptions. In some implementations of the methods and devices, the processing stages include a plurality of special purpose packet processing stage circuits.

In some implementations of the methods and devices, the system includes an orchestration means for orchestrating the means for tracing of the network flow.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 10 is a high-level conceptual diagram of using configuration data to configure a match-action pipeline for processing a network traffic flow according to some aspects.

FIG. 11 is a high-level diagram illustrating policies that may be implemented by a processing stage of a packet processing pipeline circuit according to some aspects.

Throughout the description, similar reference numbers may be used to identify similar elements.

DETAILED DESCRIPTION

Figure 1:
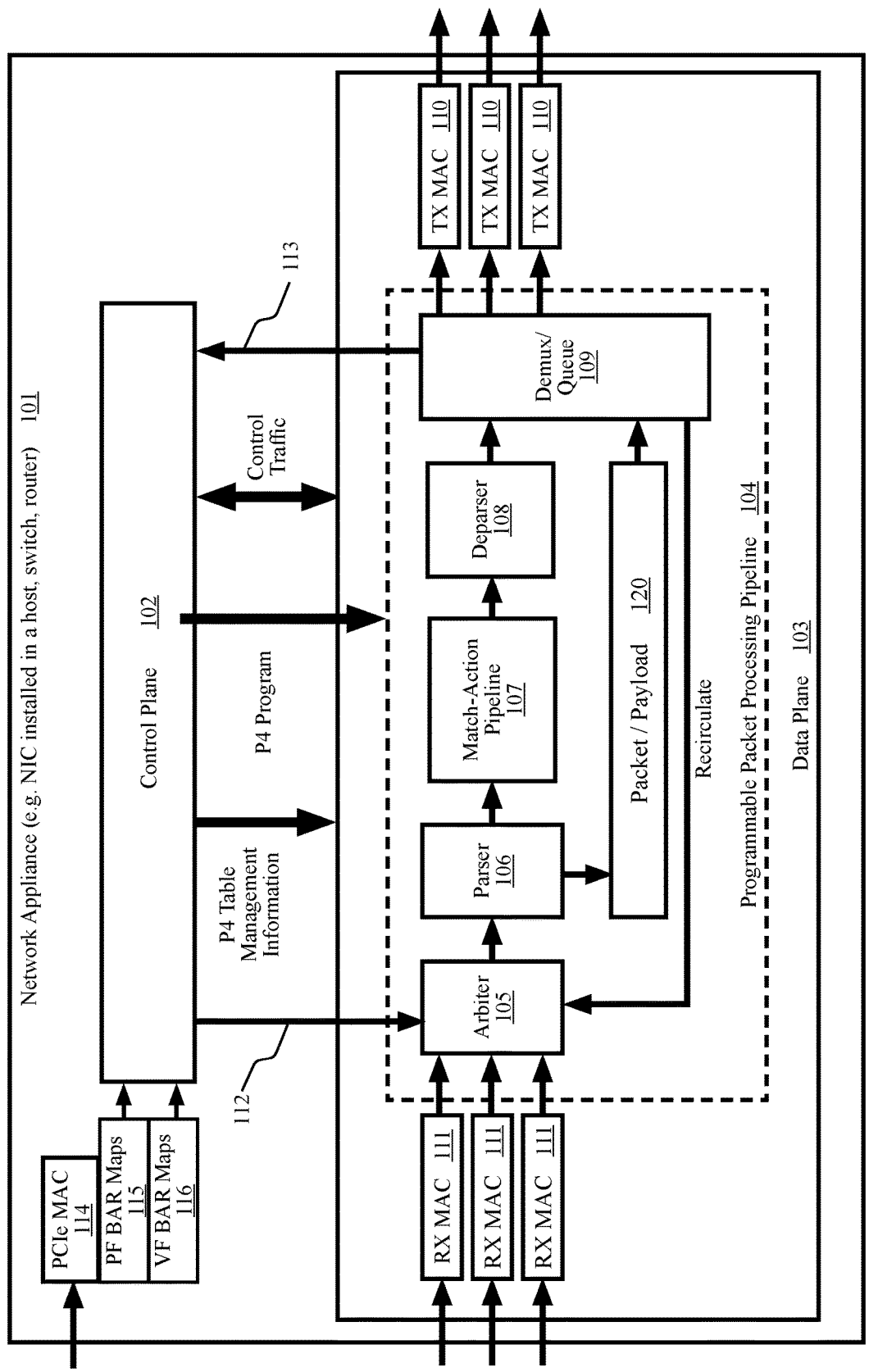
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network appliances are often configured to process network packets using network rules such as routing rules, firewall rules, load balancing rules, and other rules. A network appliance can have a control plane, often called the slow plane, and a data plane, often called the fast plane. The control plane can directly use the network rules for processing network packets, but such control plane processing is slower than the processing achievable by the data plane. The data plane can include a packet processing pipeline that can be configured to process specific network traffic flows. When a network appliance receives the first packet of a new network packet flow, the data plane is not yet configured to process that network packet. As such, the control plane can process the network packet and can produce configuration data for configuring the packet processing pipeline to process network packets of the new network flow. The configuration data can indicate policies for the network packets of specific network flows. The examples of such policies can include instructions to drop the packet, rewrite the header, forward the packet, etc. The configuration data can be used to configure the packet processing pipeline to implement the policies while processing the network packets of the new network flow. The packet processing pipeline may have no indication of which network rule or network rules correspond to any of the policies. As such, tracing data from packet processing pipelines may include policy indicators but no indication of what network rule or rules have been implemented to process a packet.

Network engineers and network administrators often trace the processing of network packets in order to debug or improve the network packet processing performed by network appliances. As such, the network appliances can be configured to produce tracing data. In fact, the packet processing pipeline can be configured to produce metadata that indicates which policy was implemented at which pipeline stage (or stages) while processing a specific network packet. The metadata can be included in tracing data that is presented to a network engineer. Such tracing data may be difficult to interpret because the packet processing pipeline may have no indication of which network rule or network rules correspond to any of the policies that are implemented. As such, the tracing data may include a policy indicator that indicates a policy that was implemented while processing the packet, but the specific network rule implemented via the policy may be extremely difficult to discern. For example, the policy indicators may be dynamically created or allocated by the control plane and may provide little, if any, clue regarding which network rule has been applied.

The control plane can create a configuration map as well as the configuration data. The configuration map can associate network rules with policy indicators. The configuration map may be used to supplement the tracing data to indicate the specific network rules implemented at the stages of the packet processing pipeline. The network engineer may therefore be supplied with visibility into the implementation of the network rules inside of the packet processing pipeline. Such data is valuable for locating misconfigured packet processing pipelines, for debugging network rules, for debugging the production of configuration data from network rules, and even for debugging the hardware of the packet processing pipeline.

Network packets may be processed by numerous network appliances. For example, a network packet arriving at a datacenter may be processed by an ingress router, at least one internal router, a top of rack switch, a load balancer, and a distributed service card (DSC) installed in a server that is running a web server in a VM. Network flows between different servers inside the data center may transfer data via TCP/IP connections, UDP/IP packets, etc. Those network flows within the data center may be processed by at least two top of rack switches, at least two DSCs, and numerous other switches and routers between the servers. A network engineer may trace the network packets as they are processed by each network appliance. In addition, the network engineer may trace the processing of the network packets by the processing stages inside the packet processing pipelines of the network appliances.

A trace orchestrator can send trace directives to the many network appliances. The trace directives can instruct the network appliances to produce trace reports for specific network traffic flows. As such, the network appliances can configure the packet processing pipelines in their data planes to produce metadata that indicates which stages implemented which policies while processing network packets for those specific network flows. As discussed above, configuration maps can be used to determine which network rule has been implemented by which processing stage. A report assembler can receive trace reports or metadata from the network appliances and can produce a trace report showing, for each network packet or flow, which networking rule was applied by which processing stage of which network appliance. As such, the processing of network flows across entire networks can be traced and the tracing data can indicate not only the network appliance, but the network rules that were applied and what stages of the packet processing pipelines implemented each network rule.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (Ms) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "$P4_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
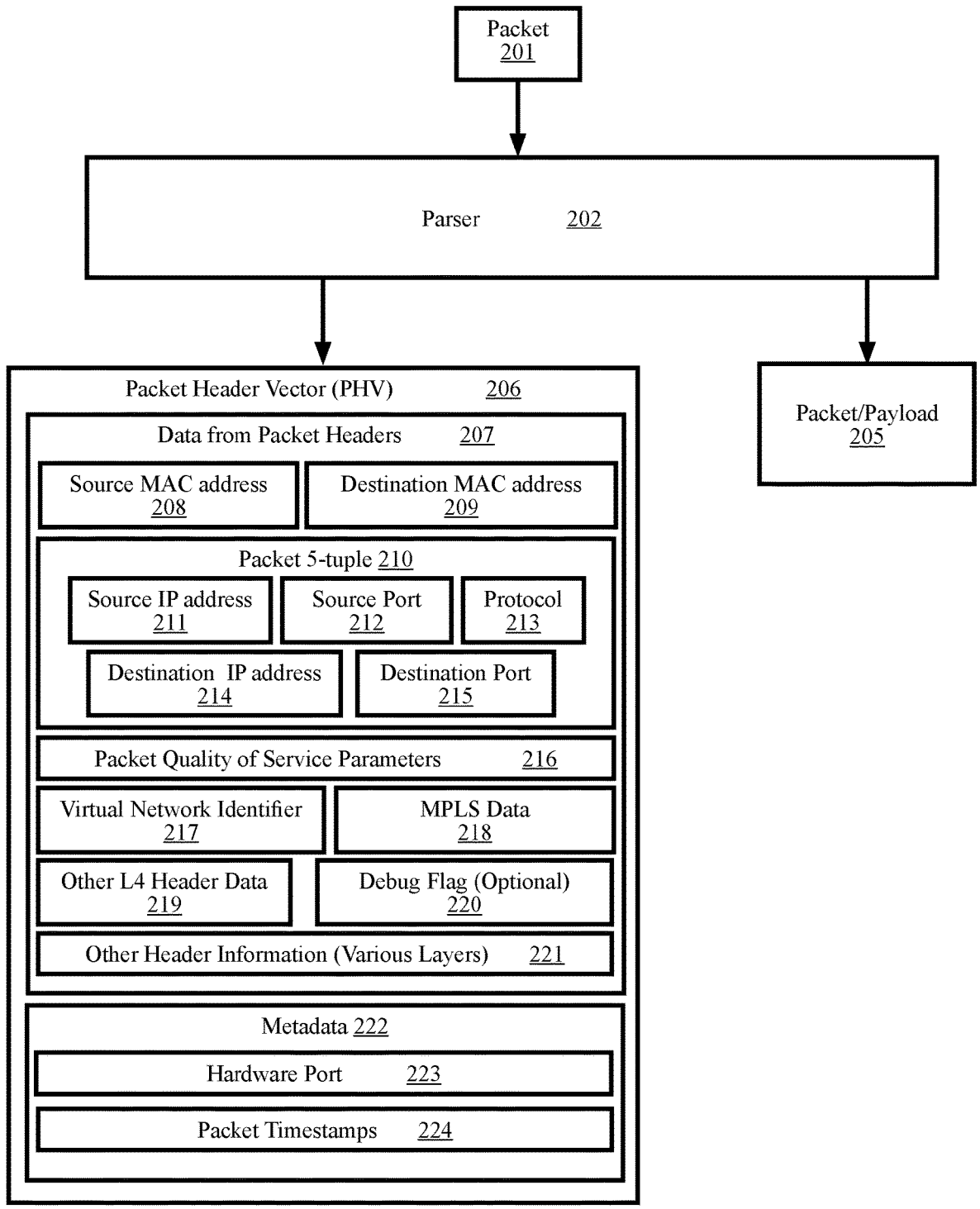
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamps 224 indicating when the packet 201 was received by the network appliance, enqueued, dequeued, etc.

The source MAC address 208 and the destination MAC address 209 can be obtained from the packet's layer 2 header. The source IP address 211 can be obtained from the packet's layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packet's layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. A number of different sources may add a debug flag 220 to the PHV. A trace instruction or flag may be present in the network packet, in which case the parser may place the debug flag in the PHV. For example, the layer 7 packet may include the trace instruction or flag. If the network packet does not include a trace instruction or flag, then the parser might not add a debug flag to the PHV or might not set a debug flag in the PHV. A match-action unit in the packet processing pipeline may be configured to turn on tracing for certain network flows and may therefore add the debug flag 220 to the PHV or may set a debug flag in the PHV. The debug flag 220 may be in the metadata 222. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
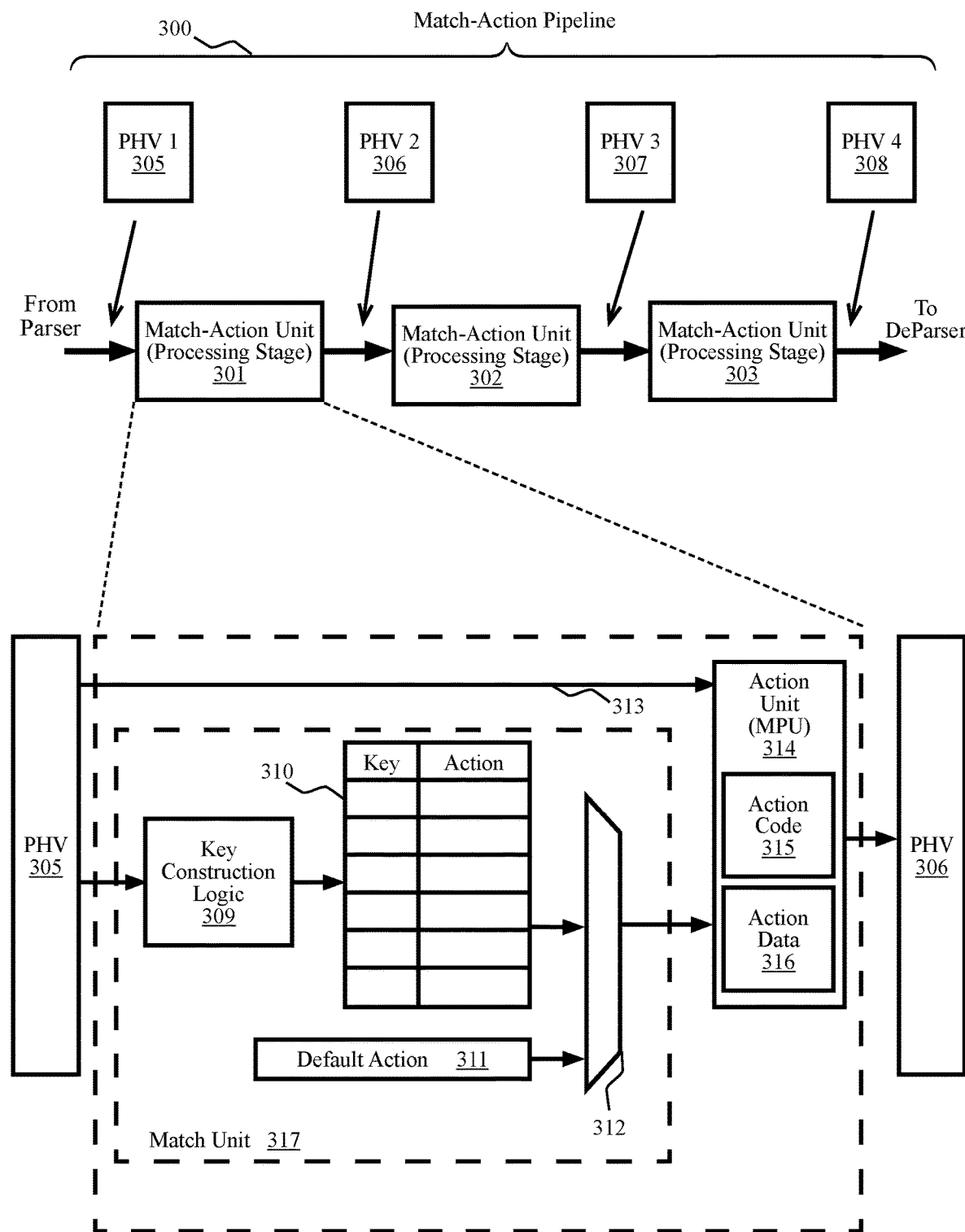
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often simply called stages, of the packet processing pipeline. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
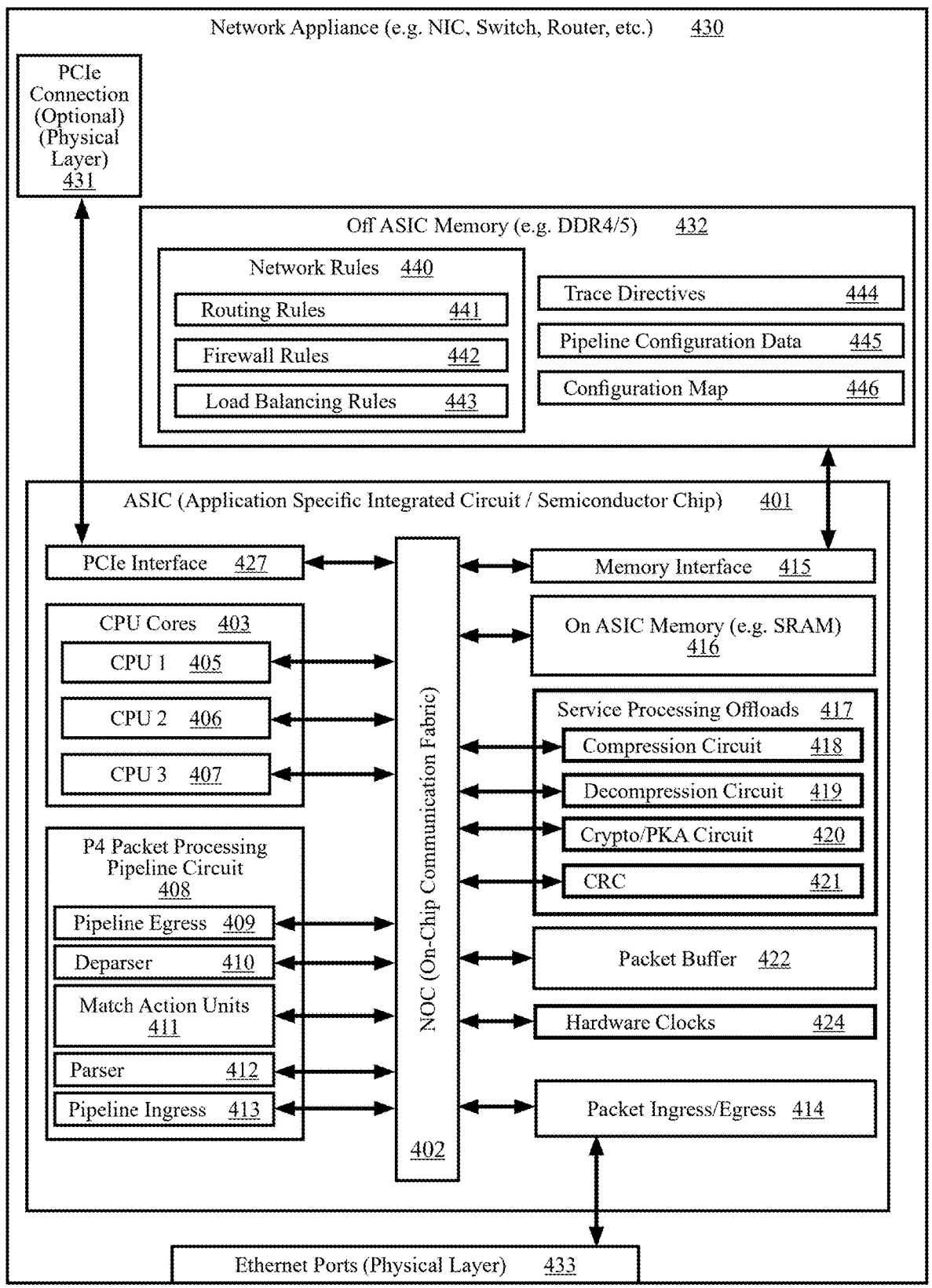
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a cyclic redundancy check (CRC) calculation circuit 421. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by IP (internet protocol) packets.

A network device can include precision clocks that output a precise time, clocks that are synchronized to remote authoritative clocks via PTP, and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline circuit 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that implements network flow tracing within a packet processing pipeline can use the memory 432 to store network rules 440, trace directives 444, pipeline configuration data 445, and a configuration map 446. The network rules 440 can include routing rules 441, firewall rules 442, load balancing rules 443, and other types of network rules.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuit 408.

The packet processing pipeline circuit 408 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
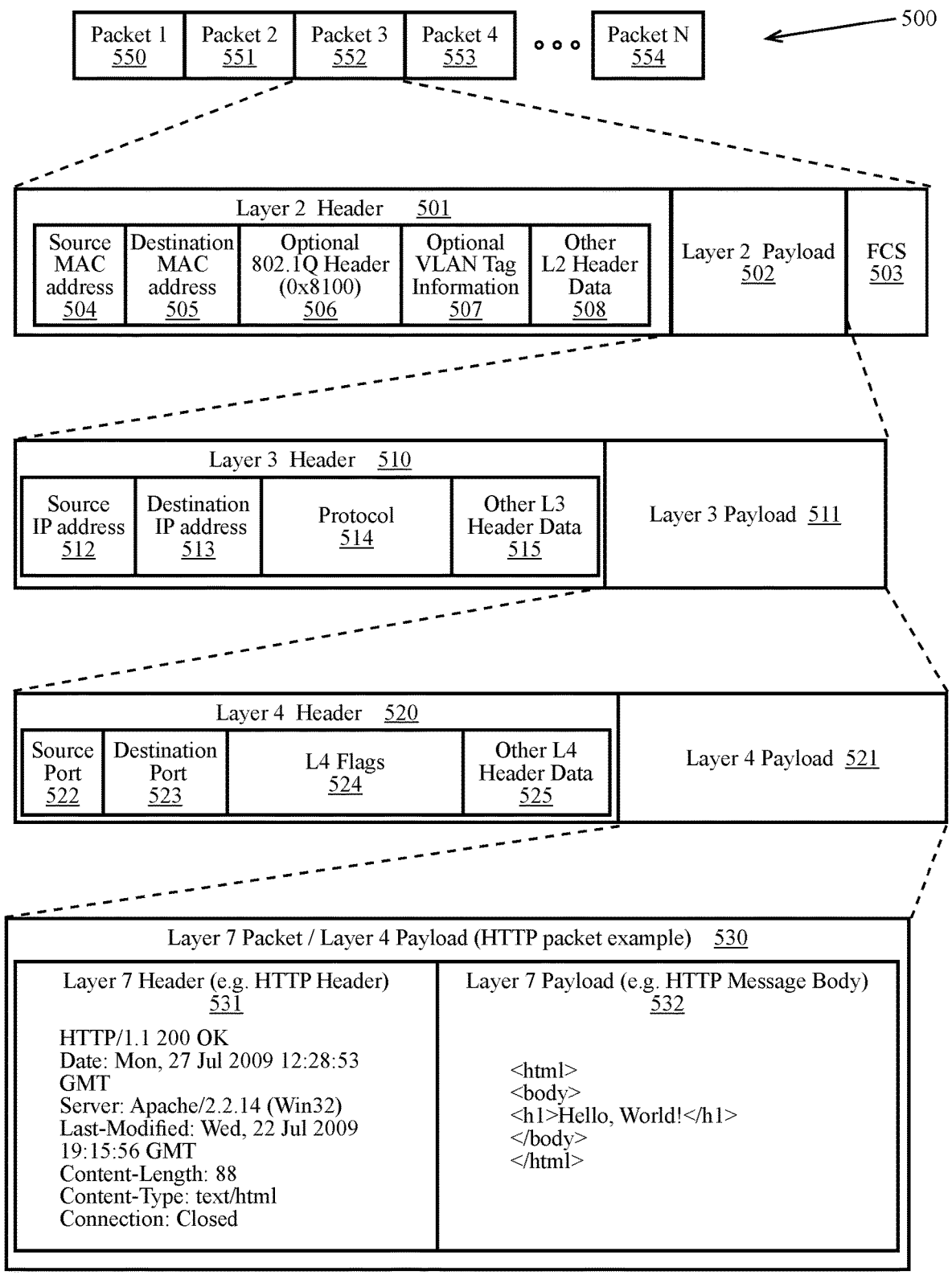
FIG. 5 illustrates packet headers and payloads of packets for network traffic flows including layer 7 fields according to some aspects.

FIG. 5 illustrates packet headers and payloads of packets for a network flow 500 including layer 7 fields according to some aspects. A group of network packets passing from one specific endpoint to another specific endpoint is a network flow. A network flow 500 can have numerous network packets such as a first packet 550, a second packet 551, a third packet 552, a fourth packet 553, and a final packet 554 with many more packets between the fourth packet 553 and the final packet 554. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS)

503. The layer 2 header can contain a source MAC address 504, a destination MAC address 505, an optional 802.1Q header 506, optional VLAN tag information 507, and other layer 2 header data 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is an HTTP packet. The layer 7 header 531 is an HTTP header, and the layer 7 payload 532 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 6:
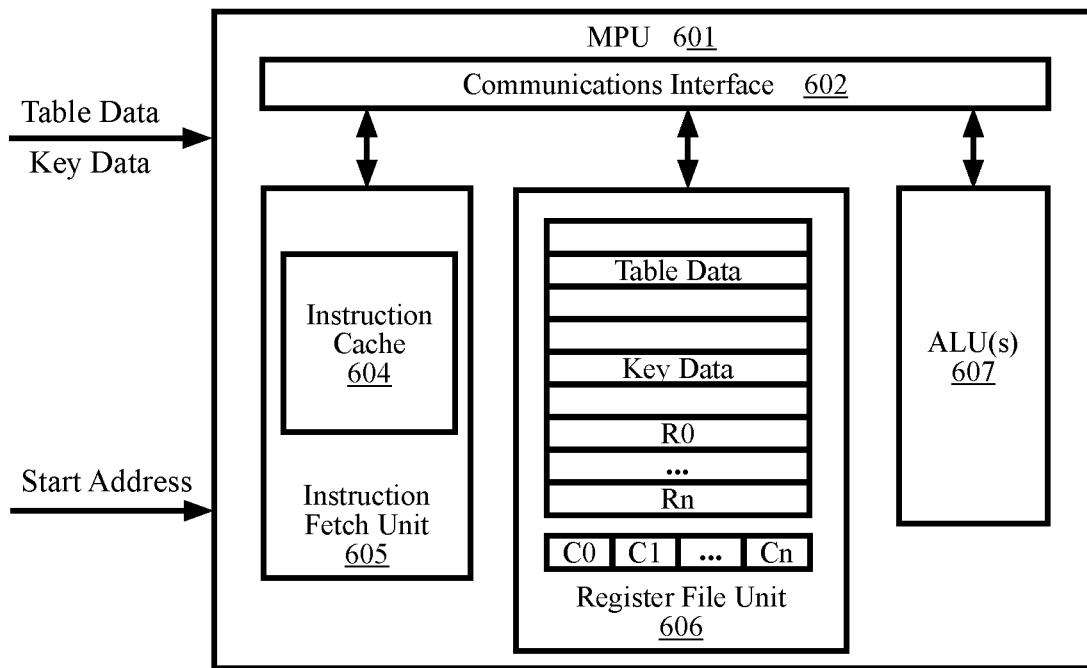
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action unit.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
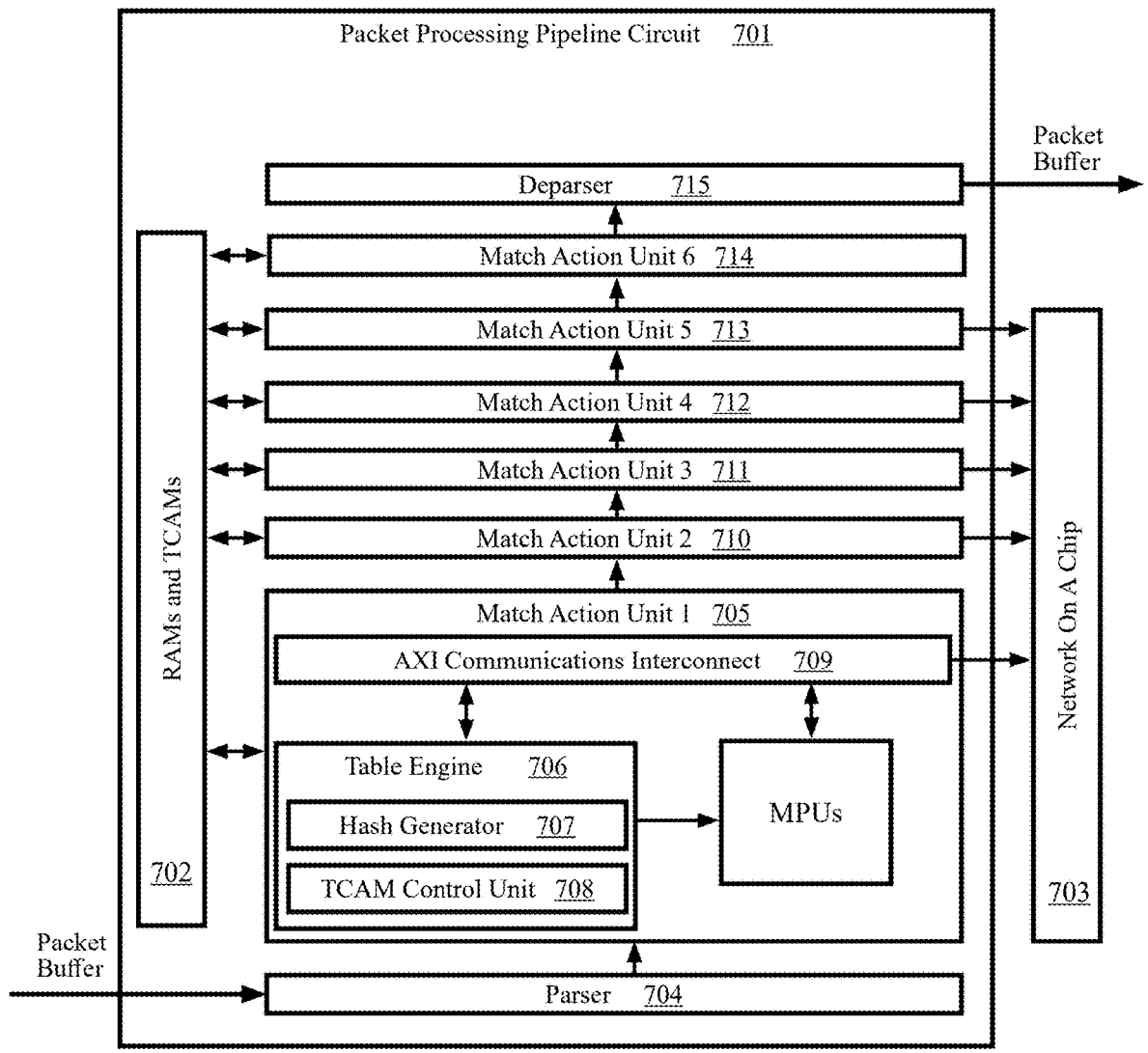
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through processing stages (e.g., processing stages 705, 710, 711, 712, 713, 714) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 has a P4 pipeline that can be implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action units 705, 710, 711, 712, 713, 714 can be the same as the MPU 601 of FIG. 6. Match-action units can have any number of MPUs. The match-action units of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (1Pv4), Internet Protocol version 6 (1Pv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

In some embodiments, the table engine 706 can have a hash generation unit 707. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset can be added to create a memory index. The memory index may be sent to the DRAM or SRAM array and to perform the read.

The table engine 706 can have a TCAM control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 7. In practice, a match-action pipeline can have any number of match-action units. The match-action units can share a common set of SRAMs and TCAMs 702. The SRAMs and TCAMs 702 may be components of the pipeline. This arrangement may allow the six match-action units to divide match table resources in any suitable proportion which provides convenience to the compiler and eases the compiler's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

Figure 8:
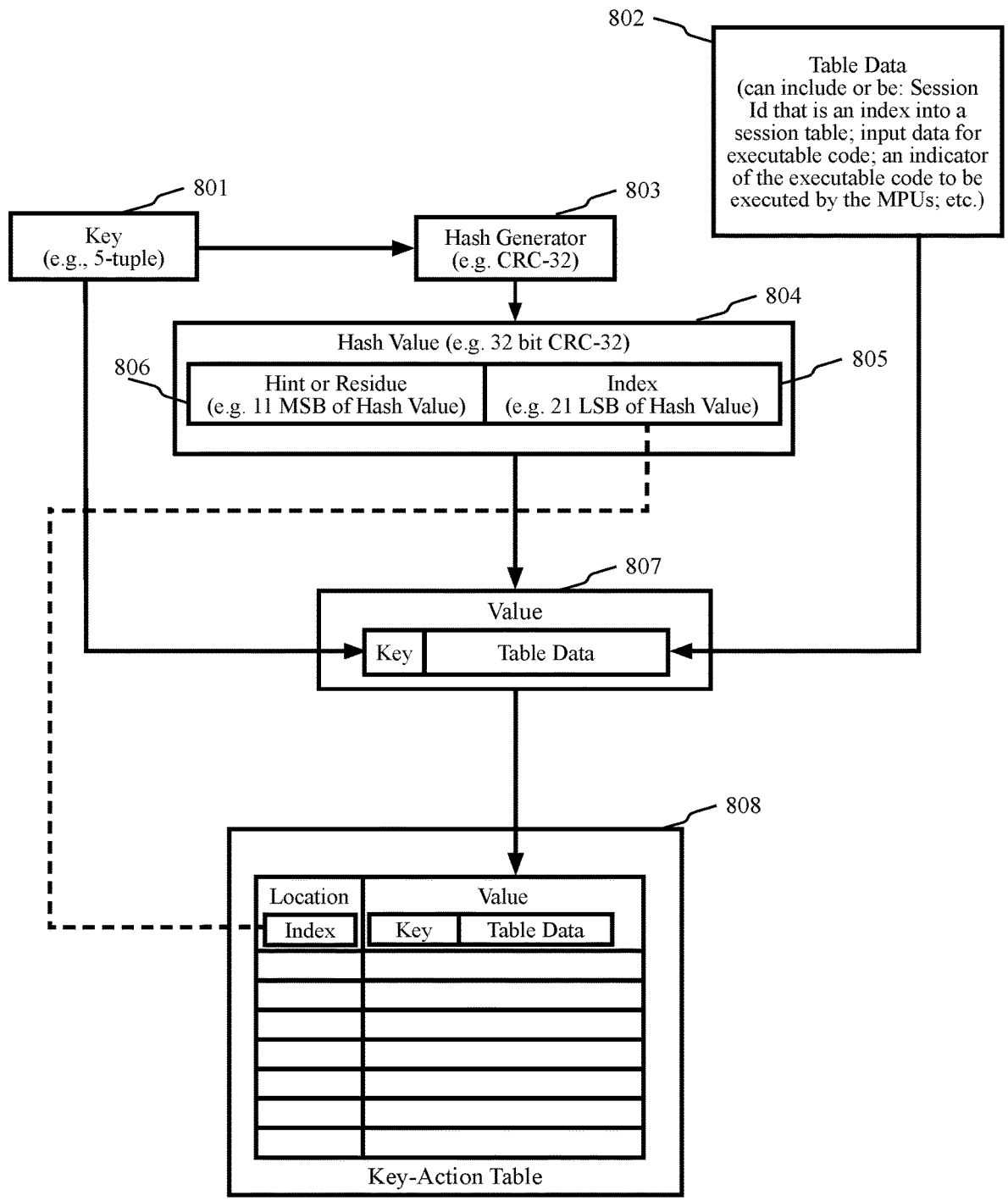
FIG. 8 illustrates populating a key-value table according to some aspects.

FIG. 8 illustrates populating a key-value table according to some aspects. In the non-limiting example of FIG. 8, a key 801 is read from a PHV. The key can be, for example, the 5-tuple of the packet or can be assembled from other data in the PHV. A hash generator 803 receives the key 801 and generates a hash value. The hash value can be a CRC-32 computed using the key or can be computed using a different hashing algorithm or different PHV fields. The hash value 804 can be divided into an index 805 and a hint or residue 806. For example, the index 805 can be the 21 least significant bits of the hash value 804 while the residue 806 can be the remaining 11 bits. The index can provide the location of a value 807 in a key-value table 808. The number of bits chosen for the index determines the size of the table. Note that the term "key-value table" (or "key-value database"), is here used as a term of art and does not necessarily indicate that key 801 is the index 805 for the table 808. The value 807 can contain the key 801, and table data 802. The key-value table can contain millions of values such as value 807. Each of the values can be stored at a location indicated by the index. Hash collisions can occur because multiple keys can have the same index. Those practiced in data structures are aware of refinements to key-value tables for resolving hash collisions.

Table data 802 and key 801 can be stored within the value field in the key-action table 808. The table data 802 can be, for example, data that is input to a function (e.g., one or more arguments of a function), or can indicate a set of instructions that can be executed by the MPUs (e.g., a pointer to function). In some embodiments, the table data is a session Id that is passed as an input to executable code such as a function (set of instructions) that is run when a table lookup produces a value having the same key as the key 801. The table data can be or can include any one or more of: a session Id that is an index into a session table; input data for executable code; an indicator of the executable code to be executed by the MPUs; or other data. A session table can be a key-value table with the session Id being an index into the table (the key). A session table value, located in the session table via the session Id, can be or indicate executable code and data to be used to process a packet. As such, the session Id can indicate, via a session table, the executable code and data to be used to process a packet.

If a pipeline is configured for a network traffic flow, the key-value table has an entry for that flow. A table lookup uses the index 805 calculated from the key 801 and can return the value 807 at the indexed location in the key-value table 808. A collision occurs when the index calculated for two different flows are the same. Key-value table implementations in most network appliances include aspects for collision handling. For example, the value can include a pointer to another entry, thereby implementing a linked list. If the key being searched for does not match the key stored in the value, then the linked list pointer can be followed until a value with a matching key is found or the list is exhausted which indicates that there is no matching value stored in the table. When there is no matching entry in a flow table, a flow miss occurs.

Figure 9:
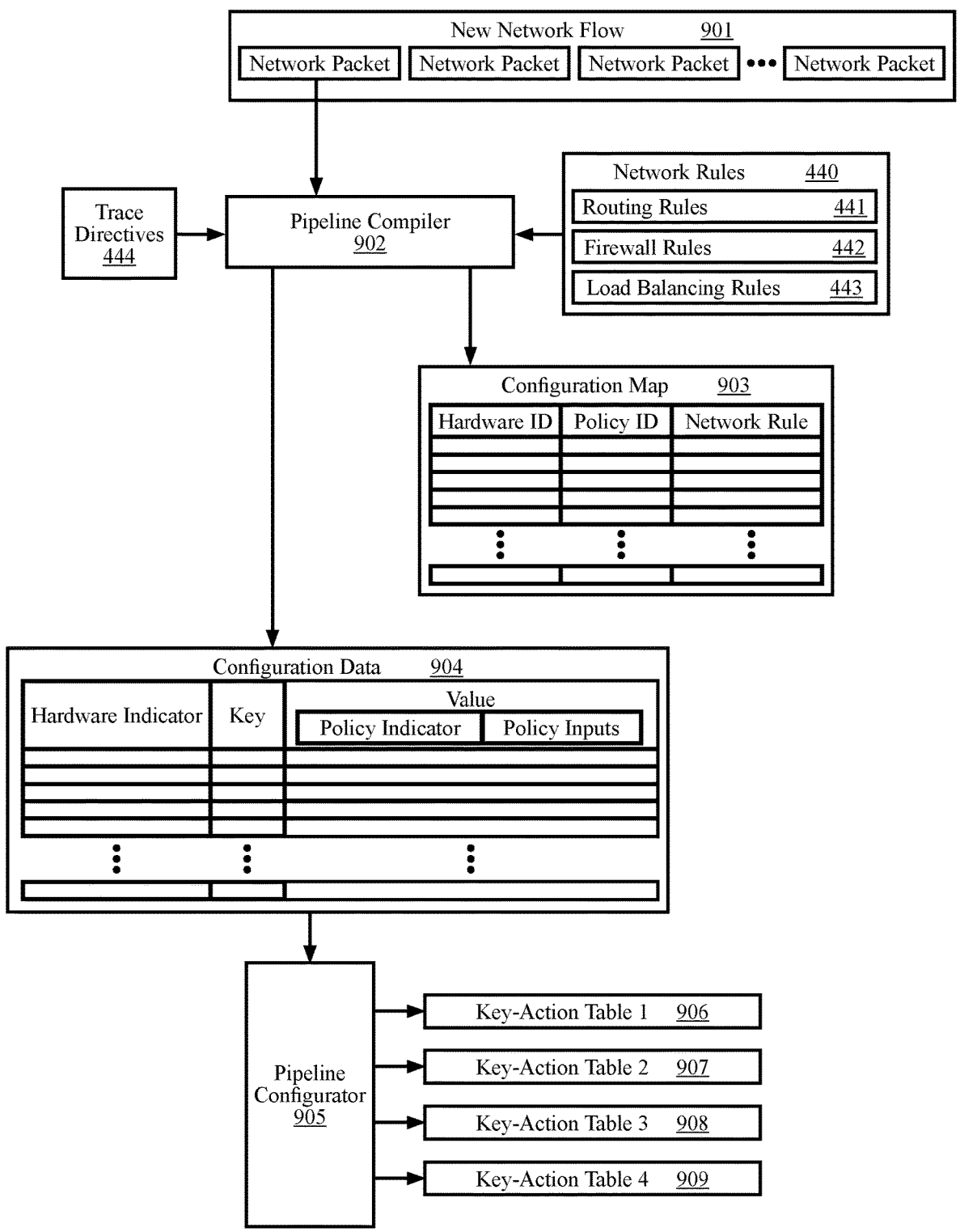
FIG. 9 is a high-level diagram illustrating using network rules to produce configuration data and a configuration map according to some aspects.

FIG. 9 is a high-level diagram illustrating using network rules to produce configuration data and a configuration map according to some aspects. A new network flow 901 can include many network packets. Initially, the packet processing pipeline may not be configured to process a network packet in the new network packet flow 901. When the first network packet of the new flow is received, a flow miss occurs and the packet is sent to the control plane for processing. The control plane can process the network packet in accordance with the network rules 440. By processing the network packet, the control plane determines exactly how the network rules 440 are applied to that specific network packet. As such, the control plane has identified the policies (e.g., drop, forward to x, rewrite to y, . . . ) were implemented for processing that specific network packet. The pipeline compiler 902 can similarly determine the policies that are to be implemented for processing specific network packets. The pipeline compiler 902 can select policies that instruct the processing stages to produce metadata for tracing the network flows indicated by the trace directives 444. The pipeline compiler 902 may then create configuration data 904 that indicates which pipeline stage is to implement which of the policies that were identified for processing the packet. The configuration data can include numerous configuration data entries. A configuration data entry can include a hardware indicator, a key, and a value. The hardware indicator can indicate a match-action table or a processing stage of the data plane's packet processing pipeline. A data plane may include numerous packet processing pipelines. As such, the hardware indicator may also indicate a packet processing pipeline to thereby indicate a specific processing stage of a specific pipeline. The key can be a key such as key 801 shown in FIG. 8 that can be used to identify the new network flow. The value can include a policy indicator and policy inputs. The policy indicator can indicate a program or set of instructions to execute for processing the network packet at the processing stage indicated by the hardware indicator. The policy inputs can be input values or arguments that can be provided to the program or set of instructions.

The pipeline configurator 905 can write the configuration entries into the key-action tables of the pipeline processing stages. For example, writing a configuration data entry into key-action table 1 906 can configure the first processing stage to process packets for the new network flow. Writing a configuration data entry into key-action table 2 907 can configure the second processing stage to process packets for the new network flow. Writing a configuration data entry into key-action table 3 908 can configure the third processing stage to process packets for the new network flow. Writing a configuration data entry into key-action table 4 909 can configure the fourth processing stage to process packets for the new network flow.

As discussed above, the pipeline compiler 902 can use the network rules to identify the policies to be applied to a packet and which of the pipeline stages are to implement each policy. As such, the pipeline compiler can create a configuration map 903 that associates network rules 440 with hardware IDs and policy IDs. The configuration map 903 can include a number of configuration map entries. The configuration map entries can include a hardware ID, a policy ID, and a network rule. A packet processing pipeline can produce metadata for tracing that includes a hardware ID and a policy ID. The configuration map can be used to identify the network rule associated with a particular combination of hardware ID and policy ID.

The configuration data entries in the configuration data 904 include values for "hardware indicator" and "policy indicator". The configuration map entries in the configuration map 903 include values for "Hardware ID" and "Policy ID". "Hardware ID" and "hardware indicator" may use the same value to indicate the same processing stage in the packet processing pipeline circuit. Alternatively, "hardware ID" and "hardware indicator" may use different values to indicate the same processing stage. For example, "hardware identifier" can be used by the pipeline configurator to select a match-action unit or a key-action table to configure. "Hardware ID" is a value that is written into the tracing/debugging metadata. The specific value for the hardware ID that is written into the metadata may be selected by the control plane or the pipeline compiler for use in the configuration map. When numerous packet processing pipeline circuits are present, a hardware ID may indicate a specific processing stage in a specific packet processing pipeline circuit. For example, a hardware ID may indicate the fourth processing stage of the egress packet processing pipeline of a specific switch.

A match-action unit or packet processing pipeline can implement a policy by executing the policy's executable code or performing the policy's operations while processing a network packet. "Policy ID" and "policy indicator" may use the same value to indicate a specific policy. Alternatively, "policy ID" and "policy indicator" may use different values to indicate the same policy. The policy indicator may be, for example, a memory address of executable code or an entry point for code execution. "Policy ID" is a value that is written into the tracing/debugging metadata. The specific value for the policy ID that is written into the metadata may be selected by the control plane or the pipeline compiler for use in the configuration map. Of further note, the policy IDs may be selected such that the configuration map entries do not require hardware IDs to determine a network rule. One or more policy IDs may be mapped to a specific network rule regardless of which network stage implemented the policy. In some aspects, the hardware identifier may be implicit in the policy ID. For example, one policy ID value may indicate processing stage 1 and network rule 5 while a different policy ID value may indicate processing stage 3 and network rule 5.

FIG. 10 is a high-level conceptual diagram of using configuration data to configure a match-action pipeline for processing a network traffic flow according to some aspects. The hardware indicator values indicate that the first, second, and fourth entries are to be written into key-action table 1 906 while the third and fifth entries are to be written into key action table 2 907. Writing configuration data entries into key-action table 1 906 can configure match-action unit 1 1001 to process specific network packets. Writing configuration data entries into key-action table 2 907 can configure match-action unit 2 1002 to process specific network packets.

FIG. 11 is a high-level diagram illustrating policies that may be implemented by a processing stage of a packet processing pipeline circuit according to some aspects. The "SetDropFlag" policy can set a flag that indicates that the pocket is to be dropped by, for example, forwarding it to a drop port instead of to an egress port. A drop port can simply be a non-physical port that drops packets instead of sending them to a destination. "SetDropFlag_debug_v1" is a version of "SetDropFlag" that also produces metadata for tracing. "SetDropFlag_debug_v1" can have input values "policy_id" and "hardware_id" that are to be written into the metadata for tracing. "policy_id" and "hardware_id" can indicate the policy being implemented on the packet and the processing stage implementing the policy. "SetDropFlag_debug_v2" is another version of "SetDropFlag" that also produces metadata for tracing. A processing stage may know its own "hardware_id". In addition, the policy indicator returned by the key-action table may be used as the policy_id. As such, "SetDropFlag_debug_v2" may have no inputs and can still write "policy_id" and "hardware_id" into the metadata for tracing. "SetDropFlag_debug_v1" and "SetDropFlag_debug_v2" illustrate that either hardware_id or policy_id may be provided as arguments or may be obtained through some other means.

"WriteDestIP" can write an input destination IP address into the destination IP field of the PHV. The deparser uses the PHV to create the packet headers for outgoing packets. "WriteDestIP_debug" is a version of "WriteDestIP" that also writes "policy_id" and "hardware_id" values into the metadata for tracing. "WriteDestMAC" can write an input destination MAC address into the destination MAC field of the PHV. The deparser uses the PHV to create the packet headers for outgoing packets. "WriteDestMAC_debug" is a version of "WriteDestMAC" that also writes "policy_id" and "hardware_id" values into the metadata for tracing. "SetDebugField" can set a debug field (e.g., debug flag 220 illustrated in FIG. 2) in the PHV. Later processing stages may then automatically write "policy_id" and "hardware_id" values into the metadata for tracing. A "ClearDebugField" policy indicator may also exist. "SetDebugFlag" can set a debug flag for an MPU, a processing stage, or a packet processing pipeline. If the debug flag is set, then "policy_id" and "hardware_id" values may be automatically written into the metadata for all packets. A "ClearDebugFlag" policy indicator may also exist.

"NoOperation" does nothing. "NoOperation_debug" is a version of "NoOperation" that writes "policy_id" and "hardware_id" values into the metadata for tracing. Here, "policy_id" is shown as an input value while the hardware ID is a value already known by the processing stage.

Figure 12:
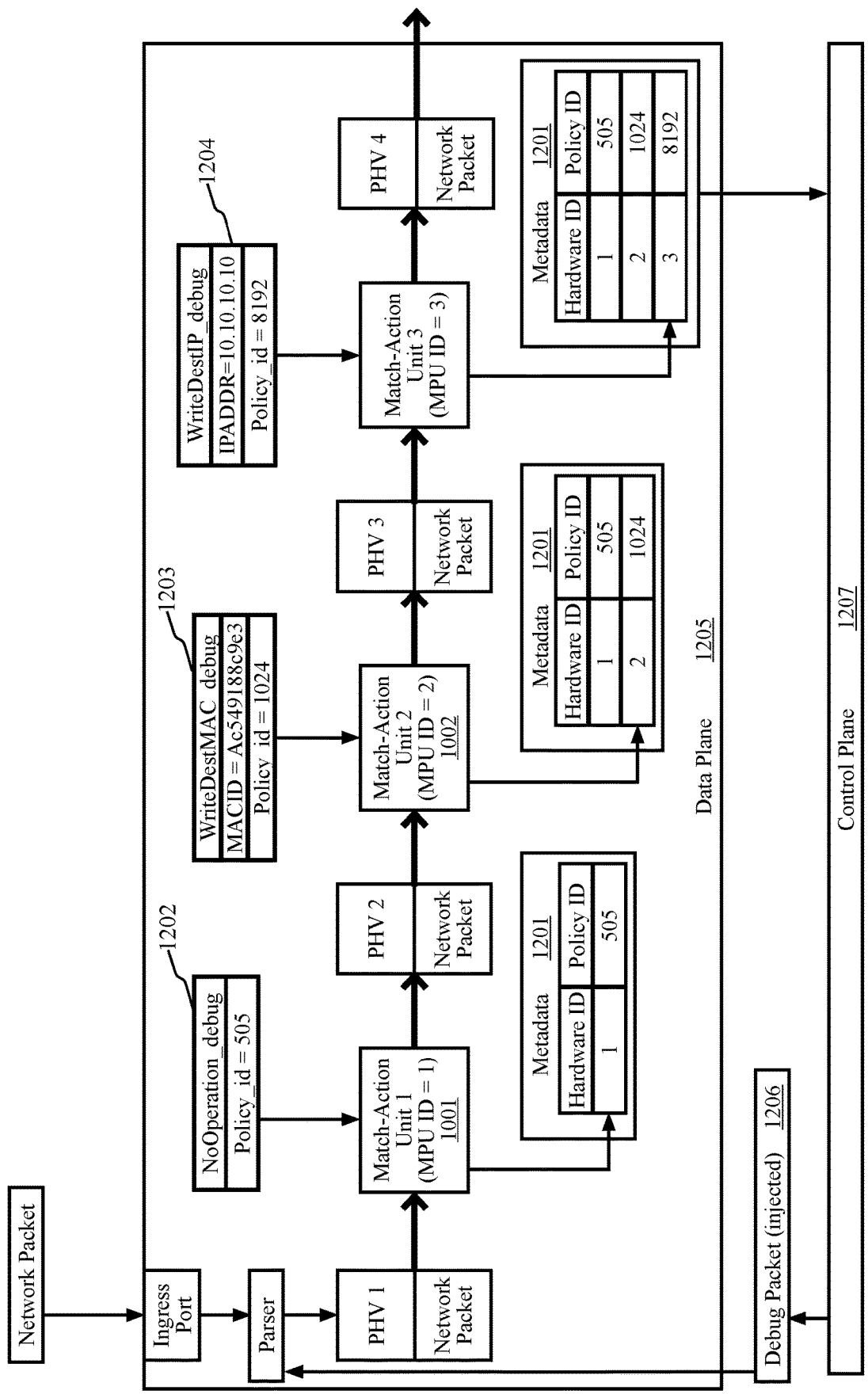
FIG. 12 is a high-level diagram illustrating metadata production by the processing stages of a packet processing pipeline circuit according to some aspects.

FIG. 12 is a high-level diagram illustrating metadata production by the processing stages of a packet processing pipeline circuit according to some aspects. The packet processing pipeline circuit is in the data plane 1205 of a network appliance. The ingress port receives a network packet. The parser produces a PHV by parsing the network packet. The network packet, or a portion of the network packet, may be stored in a packet buffer (e.g., packet buffer 422 illustrated in FIG. 4) while the pipeline processes the PHVs. Match action unit 1 1001 processes PHV 1 by implementing the "NoOperation_debug" policy 1202. The hardware ID of match action unit 1 1001 is 1. The policy ID of the "NoOperation_debug" policy 1202 is 505. In accordance with the policy, match action unit 1 1001 writes the appropriate tracing data (hardware ID=1, profile ID=505) into the packet metadata 1201. Match action unit 1 1001 produces PHV 2 from PHV 1. Match action unit 2 1002 processes PHV 2 by implementing the "WriteDestMAC_debug" policy 1203. The hardware ID of match action unit 2

1002 is 2. The policy ID of the "WriteDestMAC_debug" policy 1203 is 1024. In accordance with the policy, match action unit 2 1002 writes the appropriate tracing data (hardware ID=2, profile ID=1024) into the packet metadata 1201. Match action unit 2 1001 produces PHV 3 from PHV 2. Match action unit 3 processes PHV 3 by implementing the "WriteDestIP_debug" policy 1204. The hardware ID of match action unit 3 is 3. The policy ID of the "WriteDestIP_debug" policy 1204 is 8192. In accordance with the policy, match action unit 3 writes the appropriate tracing data (hardware ID=3, profile ID=8192) into the packet metadata 1201. Match action unit 3 produces PHV 4 from PHV 3. Further packet processing may occur in the packet processing pipeline. The data plane 1205 can send the metadata 1201 to the control plane 1207. The metadata can be included in the PHVs. For example, PHV 2 can be PHV 1 plus metadata 1201. The data plane 1205 can send the network packet's PHV to the control plane 1207 and may even send the entire network packet to the control plane 1207.

The control plane 1207 can inject a debug packet 1206 into the data plane 1205. For example, a packet for a new flow may be injected, a packet for an existing flow may be injected, or a managerial packet (e.g., a directive to set a pipeline's debug flag) may be injected. The existing flow into which a packet is injected may be in inbound network flow, an outbound network flow, or both. An inbound network flow includes network packets that are received at an ingress port of the network appliance. An outbound network flow includes network packets that are sent from an egress port of the network appliance. A further example is that the control plane of one network appliance can create a diagnostic network flow for debug purposes. The diagnostic network flow may be passed through a series of network appliances until it is dropped by the final network appliance in the series. All of the network appliances may be configured to produce a tracing report or metadata for tracing the network packets in the diagnostic network packet flow.

Figure 13:
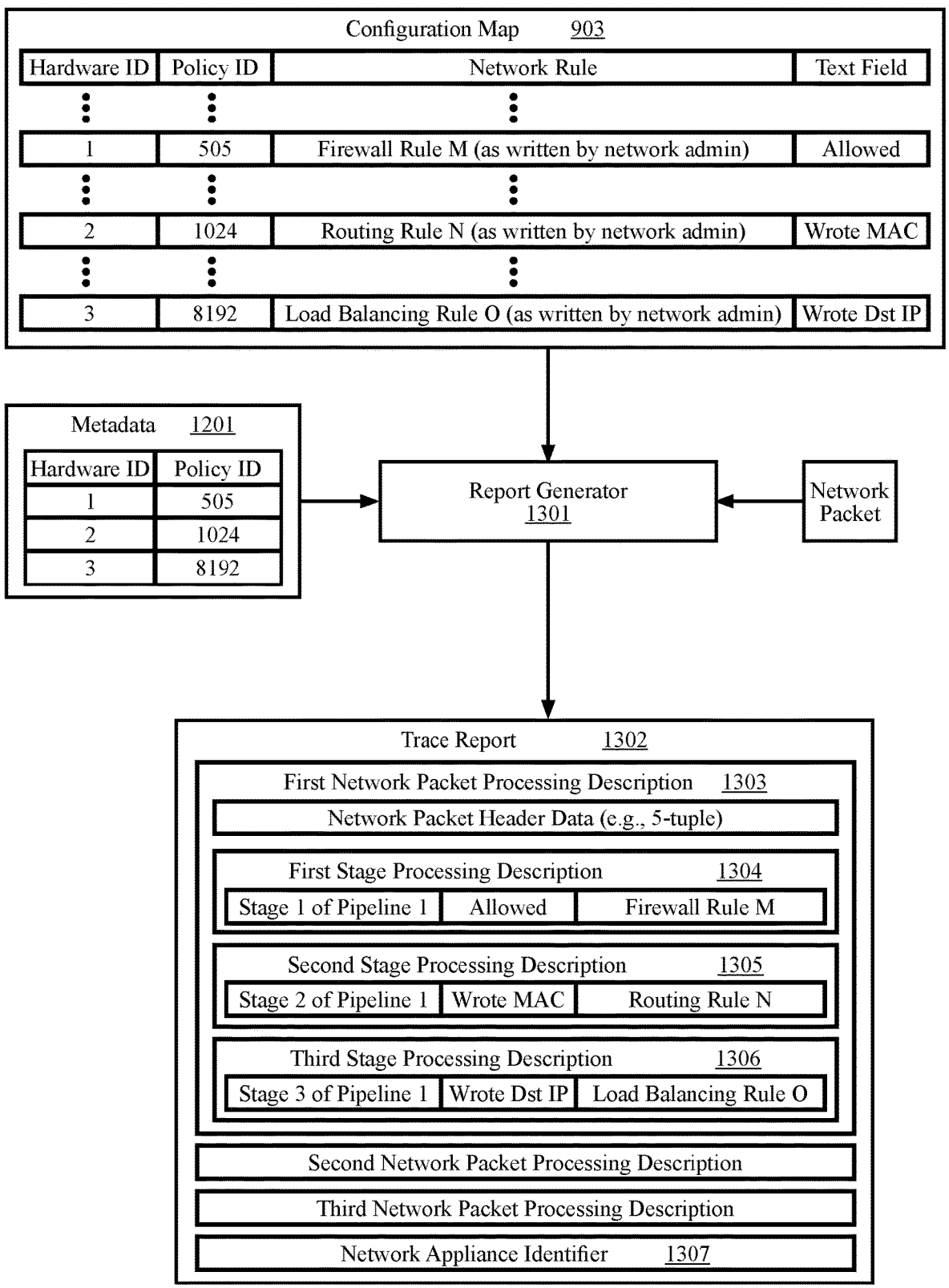
FIG. 13 is a high-level diagram illustrating a report generator producing a trace report according to some aspects.

FIG. 13 is a high-level diagram illustrating a report generator 1301 producing a trace report 1302 according to some aspects. The report generator 1301 may be a process run in the control plane. The report generator can use metadata 1201, a configuration map 903, and a network packet to produce the trace report 1302. The configuration map 903 can use a key based on the hardware id and the policy id to look up a value that includes a network rule and a text field. The network rule field can reference a network rule (e.g., "firewall rule M") or may provide the network rule (e.g., "destIP=192.168.1.0/24 AND srcIP=10.2.0.0/16: drop"). The text field can indicate the policy's outcome (e.g., "allowed" or "dropped"). The network rule and the text field can be written into a trace report 1302 along with information about the network packet (e.g., packet 5-tuple). The report generator may get the information about the packet from the network packet itself if the network packet is provided to the report generator 1301. Alternatively, the packet's PHV or the packets header fields may be provided to the report generator 1301.

The trace report 1302 can include network processing descriptions such as a first network processing description 1303, a second network processing description, and a third network processing description. A network processing description can include network packet header data (e.g., the packet 5-tuple) and stage processing descriptions such as a first stage processing description 1304, a second stage processing description 1305, and a third stage processing description 1306. A stage processing description can indicate a specific processing stage (e.g., stage 1 of pipeline 1), a network rule, and an outcome. The network rule and the outcome can be provided by the configuration map 903. For example, the first packet tracing entry in metadata 1201 is hardware id=1 and policy id=505. FIG. 12 indicates that the policy that was implemented was "NoOperation". Checking the configuration map, that particular "NoOperation" policy was implemented by that particular processing stage for that particular network packet because the packet was allowed in accordance with firewall rule M. The first stage processing description 1304 therefore indicates that stage 1 of pipeline 1 allowed the packet in accordance with firewall rule M. The trace report 1302 can also include a network appliance indicator 1307 to indicate which network appliance includes the processing stage and packet processing pipeline circuit to which the trace report applies.

Figure 14:
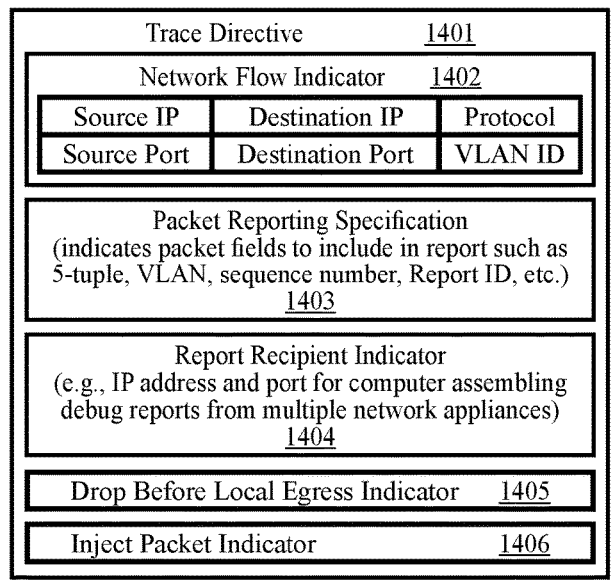
FIG. 14 illustrates a nonlimiting example of a trace directive according to some aspects.

FIG. 14 illustrates a nonlimiting example of a trace directive 1401 according to some aspects. The trace directive 1401 can include a network flow indicator 1402, a packet reporting specification 1403, a report recipient indicator 1404, a drop before egress indicator 1405, and an inject packet indicator 1406. The network flow indicator 1402 can be used to identify a specific network flow. The packet processing pipeline can be configured to process the network packets of that specific network flow and to produce tracing metadata while processing those network packets. The packet reporting specification 1403 can indicate fields to include in a trace report. For example, packet reporting specification 1403 can indicate that a network packet processing description should include the packet 5-tuple and the network appliance identifier. The report recipient indicator 1404 can indicate where the trace report is to be sent. For example, the trace report may be emailed to a network engineer, stored at a particular location in a data store, etc. The recipient may gather trace reports from a number of network appliances and generate a large comprehensive report that shows the packet processing performed by numerous network appliances in a network. A drop before egress indicator 1405 can instruct a network appliance to drop the packet instead of sending it out on the network. For example, a network packet can be dropped by passing it to a drop port instead of an egress port. As such, the packet processing pipeline may fully process a network that is dropped before being passed to an egress port. The inject packet indicator 1406 can instruct the control plane to inject a network packet into the data plane. For example, a network flow for debugging may be produced by injecting debug packets at a first network appliance. The debug packets may be routed through the network until they reach a final network appliance. The final network appliance can drop the debug packets in accordance with a drop before egress indicator 1405 that was sent to the final network appliance in a trace directive 1401.

Figure 15:
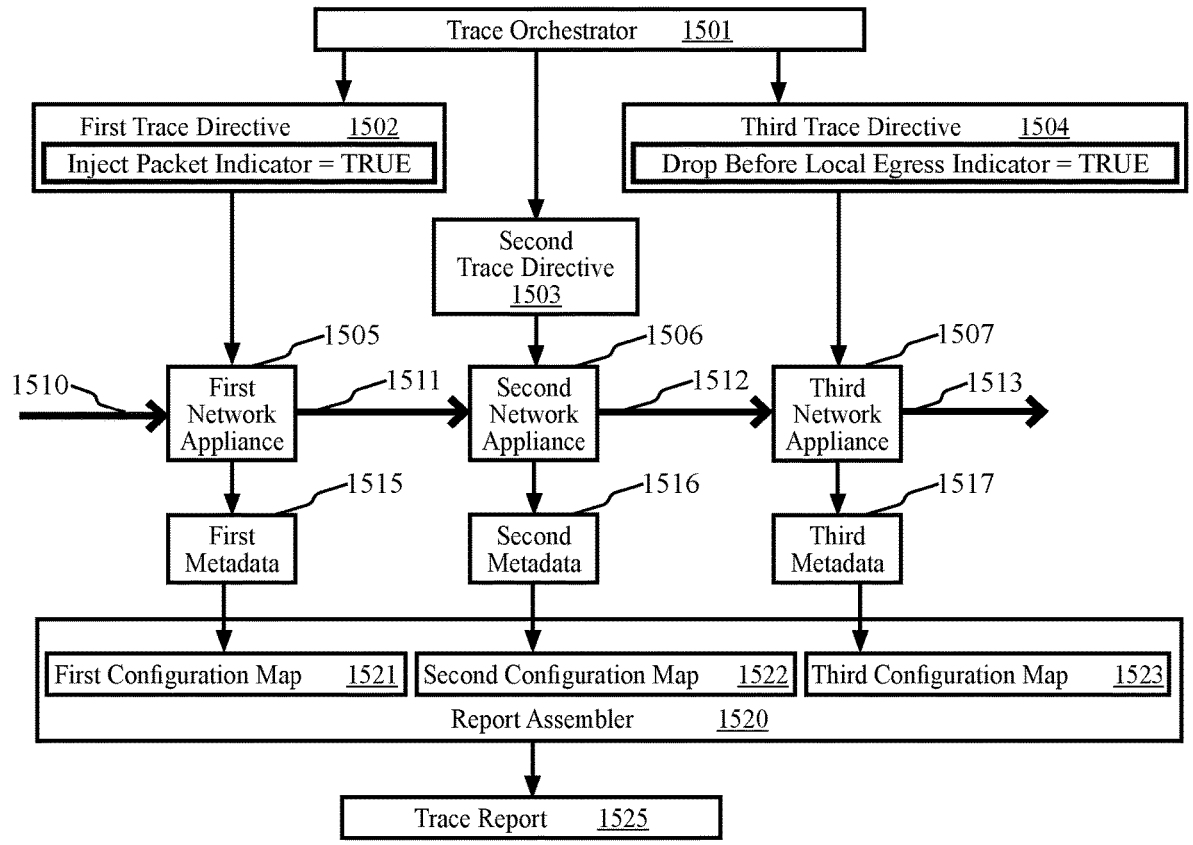
FIG. 15 is a high-level block diagram illustrating a trace orchestrator directing network appliances to send metadata to a report assembler according to some aspects.

FIG. 15 is a high-level block diagram illustrating a trace orchestrator 1501 directing network appliances to send metadata to a report assembler 1520 according to some aspects. A first network appliance 1505 is processing incoming network traffic flows 1510 and sending a first network traffic 1511 to a second network appliance 1506. The second network appliance 1506 is processing the first network traffic 1511 and sending a second network traffic 1512 to a third network appliance 1507. The third network appliance 1507 is processing the second network traffic 1512 and sending outbound network traffic 1513. The trace orchestrator 1501 can send a first trace directive 1502 to the first network appliance 1505. The first trace directive 1502 instructs the first network appliance to produce tracing metadata for a specific network flow being traced and to inject a debug packet for that network flow. The trace orchestrator 1501 can also send a second trace directive 1503 to the second network appliance 1506. The second trace directive 1503 instructs the second network appliance 1506 to produce tracing metadata for the specific network flow being traced. The trace orchestrator 1501 can send a third trace directive 1504 to the third network appliance 1507. The third trace directive 1504 instructs the third network appliance to produce tracing metadata for the specific network flow being traced and to drop network packets for that network flow without sending them out the egress port. Note that trace orchestrators may send trace directives to downstream network appliances (e.g., the second and third network appliances) before instructing the first network appliance 1505 to inject a debug packet.

The first network appliance 1505 injects a debug packet and produces a first metadata 1515 that indicates which policies were implemented by which processing stage of which packet processing pipeline of the first network appliance 1505 while processing the debug packet. The debug packet can be included in the first network traffic 1511 sent to the second network appliance 1506. The second network appliance 1506 processes the debug packet and produces a second metadata 1516 that indicates which policies were implemented by which processing stage of which packet processing pipeline of the second network appliance 1506 while processing the debug packet. The debug packet can be included in the second network traffic 1512 sent to the third network appliance 1507. The third network appliance 1507 processes the debug packet and produces a third metadata 1517 that indicates which policies were implemented by which processing stage of which packet processing pipeline of the third network appliance 1507 while processing the debug packet. The debug packet is dropped by the third network appliance 1507 and is not included in the outbound network traffic 1513.

The report assembler 1520 can store the configuration maps of the network appliances. The first configuration map 1521 can be the configuration map produced by the pipeline compiler of the first network appliance 1505. The second configuration map 1522 can be the configuration map produced by the pipeline compiler of the second network appliance 1506. The third configuration map 1523 can be the configuration map produced by the pipeline compiler of the third network appliance 1507. The report assembler 1520 can receive the first metadata 1515, the second metadata 1516, and the third metadata 1517 and use them to produce a trace report 1525 that includes the processing details from all three network appliances.

Figure 16:
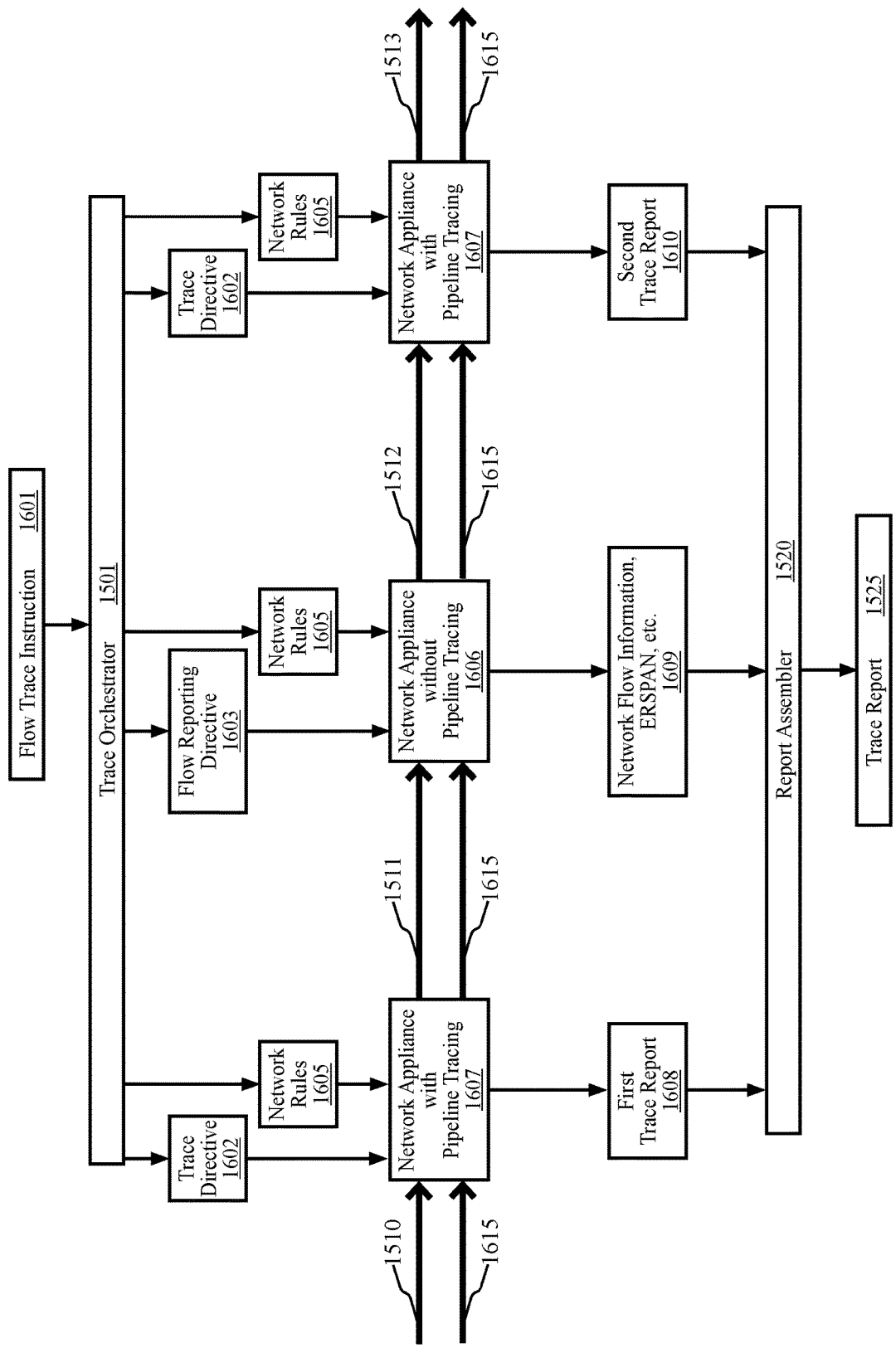
FIG. 16 is a high-level block diagram illustrating a trace orchestrator directing network appliances to send tracing data to a report assembler according to some aspects.

FIG. 16 is a high-level block diagram illustrating a trace orchestrator 1501 directing network appliances to send tracing data to a report assembler 1520 according to some aspects. The network illustrated in FIG. 16 is similar to that illustrated in FIG. 15 and includes many of the same elements. A flow trace instruction 1601 can be sent to the trace orchestrator 1501 to thereby cause the trace orchestrator to send trace directives 1602 to network appliances with pipeline tracing 1607 and to send flow reporting directives 1603 to network appliances without pipeline tracing 1606. The network appliances with pipeline tracing 1607 respond to the trace directives by configuring their packet processing pipelines to produce tracing metadata for the network traffic flows indicated by the trace directives 1602. The illustrated network includes a network appliance without pipeline tracing 1606 that is not capable of tracing the packet processing performed in its packet processing pipeline. Such a network appliance can be configured to produce some meaningful data for a trace report. For example, a flow reporting directive 1603 can instruct a network appliance to produce network flow information such as encapsulated remote switched port analyzer (ERSPAN) data 1609. ERSPAN is a well known flow reporting technology that is supported by many network appliances.

The network appliances of FIG. 15 may send metadata (e.g., the metadata 1201 illustrated in FIG. 13) to the report assembler 1520. The network appliances of FIG. 16 may send trace reports (e.g., the trace report 1302 illustrated in FIG. 13) to the report assembler 1520. The report assembler can receive a first trace report 1608 from one of the network appliances with pipeline tracing 1607 and can receive a second trace report 1610 from another one of the network appliances with pipeline tracing 1607. The report assembler can receive other network flow information such as ERSPAN data 1609 from the network appliances without pipeline tracing 1606. The report assembler 1520 can use the trace reports 1608, 1610 and the other network flow information 1609 to assemble a trace report 1525 that details the packet processing across the entire network and that provides visibility into the processing performed by the individual processing stages of the packet processing pipeline circuits of some of the network appliances.

The flow trace instruction 1601 can also include network rules 1605 that are to be sent to the network appliances. A network engineer may therefore use a flow trace instruction 1601 to provide network rules for a new network flow, configure the network to process the new network flow, configure the network appliance to produce trace reports, cause the new flow to be injected into the network, and receive a tracing report detailing the processing of the network packets for that new network flow and providing visibility into the processing performed by the individual processing stages of the packet processing pipeline circuits of some or all of the network appliances.

Additional network flows 1615 are shown passing through the network. Trace directives can instruct the network appliances to trace specific network flows while not tracing other network flows such as additional network flows 1615. The pipeline compiler can, based on the trace directives, select a debug policy (e.g., NoOperation_debug) for network flows being traced and can select non-debug policies (e.g., NoOperation) for network flows that are not being traced, such as network flows 1615. As such, the packet processing pipelines may be configured to not produce additional metadata for tracing the additional network flows 1615 while also being configured to produce metadata for tracing the network traffic flows specified via trace directives.

Figure 17:
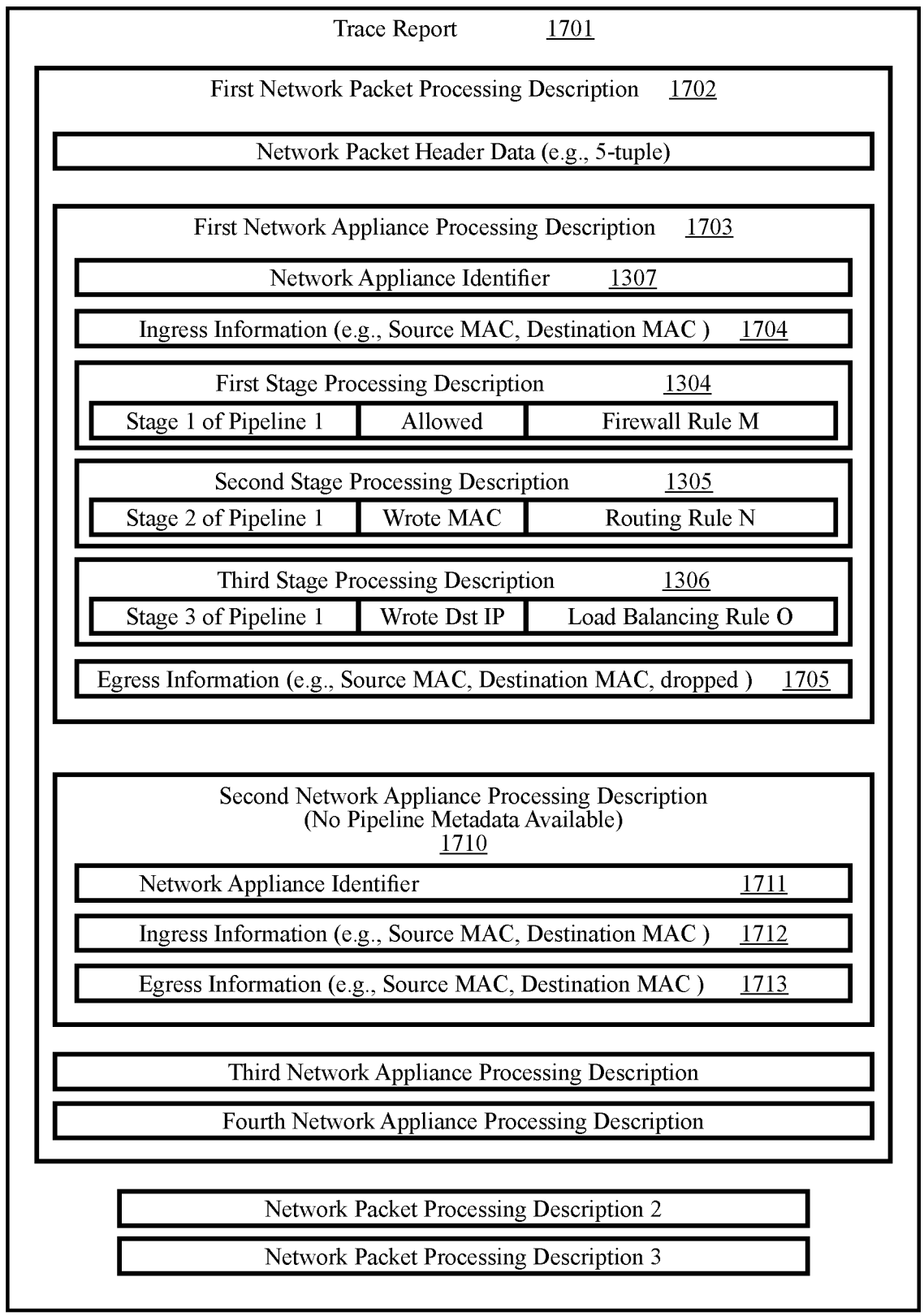
FIG. 17 illustrates a nonlimiting example of a trace report according to some aspects.

FIG. 17 illustrates a nonlimiting example of a trace report 1701 according to some aspects. The trace report 1701 of FIG. 17 is a variation of the trace report 1302 of FIG. 13 and illustrates how the report assembler can use a first trace report 1608, other network flow information 1609, and a second trace report 1610 to produce a trace report 1701. The first network packet processing description 1702 can include network packet header data that may be copied from the first trace report 1608 or some other trace report. The first network packet processing description 1702 can also include network appliance processing descriptions such as a first network appliance processing description 1703, a second network appliance processing description 1710, a third network appliance processing description, a fourth network appliance processing description, and so forth.

The first network appliance processing description 1703 includes many fields (e.g., first stage processing description 1304, . . . ) that can be copied directly from the first trace report 1608. The first network appliance processing description 1703 may also include ingress information 1704 and egress information 1705. The ingress information may be copied from the first trace report if the first trace report includes those fields, which may be available in the packets PHV. The second network appliance (e.g., the network appliance without pipeline tracing 1606 of FIG. 16) does not provide information down to the processing stage level. As such, the second network appliance processing description 1710 includes less data such as data that may be available via ERSPAN or some other tracing tool. The second network appliance processing description 1710 is illustrated as including a network appliance identifier 1711, ingress information 1712, and egress information 1713. Such information may be copied from an ERSPAN report. The remaining network appliance processing description may be similar to the first network appliance processing description 1703 or the second network appliance processing description 1710.

Figure 18:
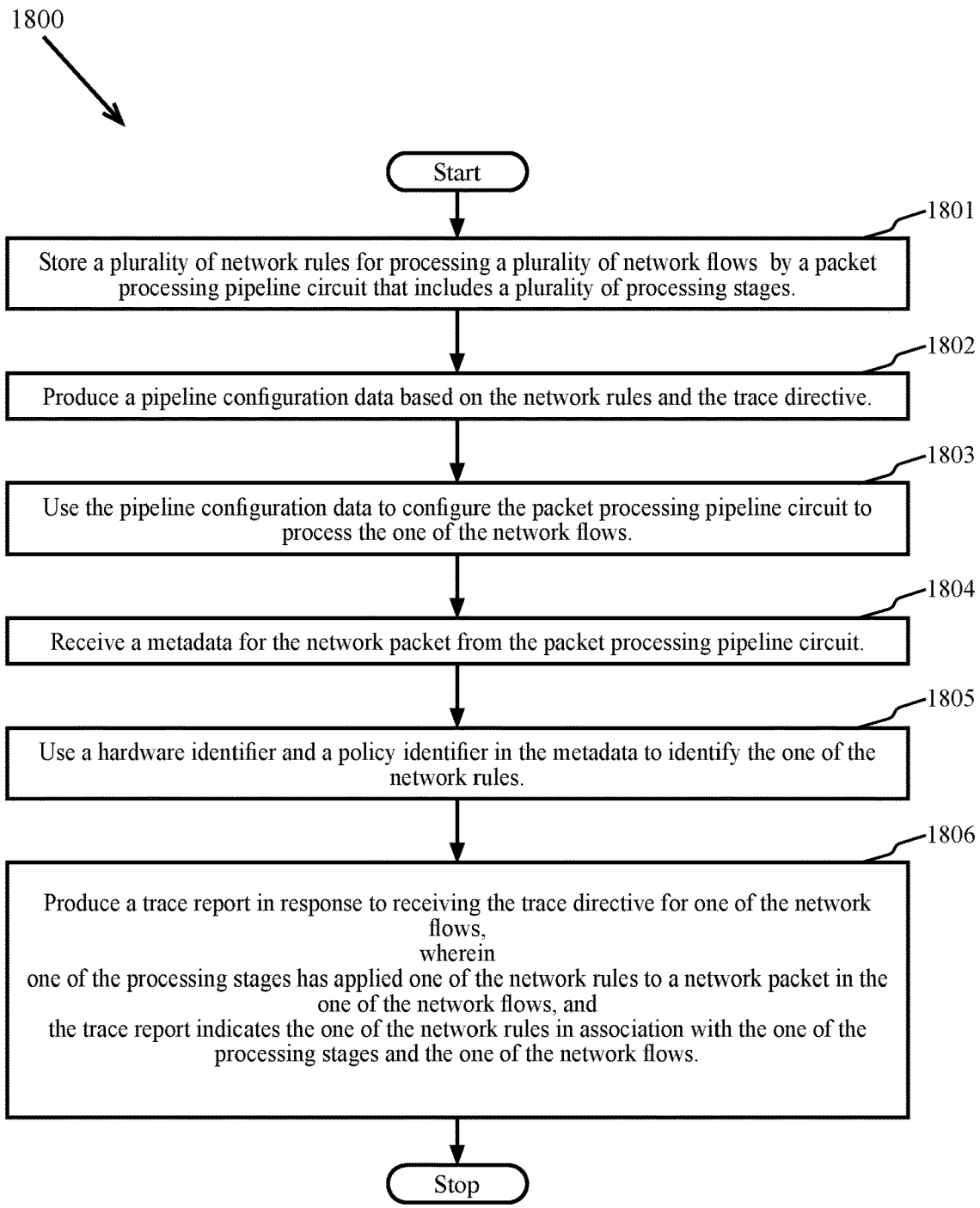
FIG. 18 is a high-level flow diagram illustrating a method for network flow tracing within a packet processing pipeline according to some aspects.

FIG. 18 is a high-level flow diagram illustrating a method for network flow tracing within a packet processing pipeline 1800 according to some aspects. After the start, at block 1801 the method can store a plurality of network rules for processing a plurality of network flows by a packet processing pipeline circuit that includes a plurality of processing stages. At block 1802, the method can produce a pipeline configuration data based on the network rules and the trace directive. At block 1803, the method can use the pipeline configuration data to configure the packet processing pipeline circuit to process the one of the network flows. At block 1804, the method can receive a metadata for the network packet from the packet processing pipeline circuit. At block 1805, the method can use a hardware identifier and a policy identifier in the metadata to identify the one of the network rules. At block 1806, the method can produce a trace report in response to receiving the trace directive for one of the network flows, wherein one of the processing stages has applied one of the network rules to a network packet in the one of the network flows, and the trace report indicates the one of the network rules in association with the one of the processing stages and the one of the network flows.

Figure 19:
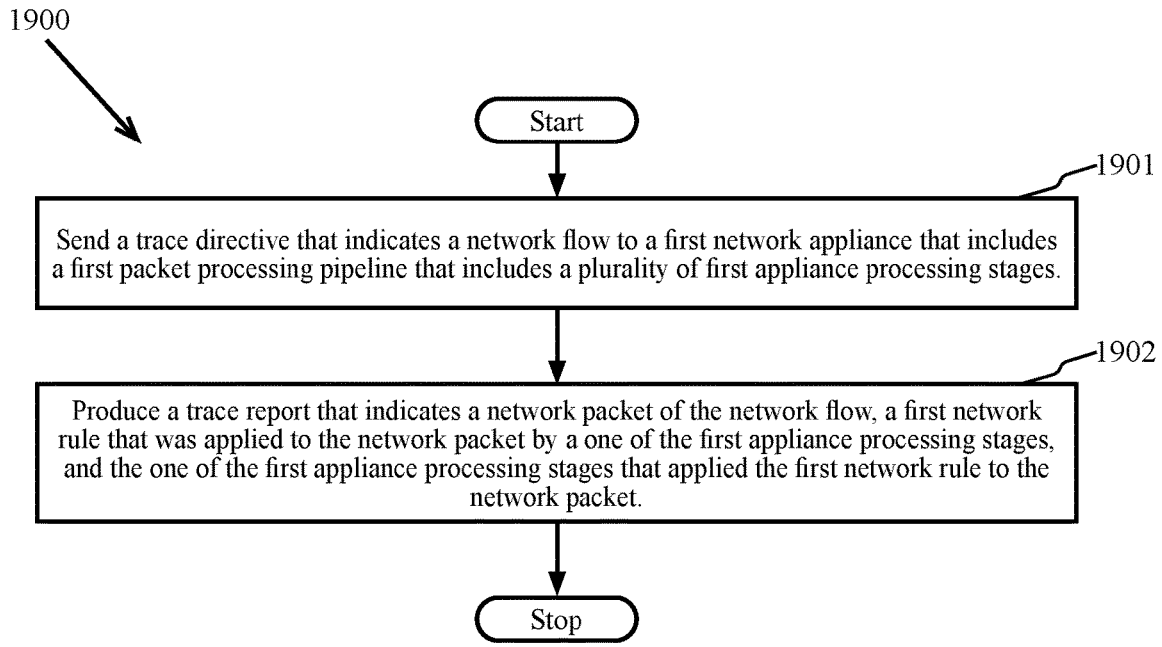
FIG. 19 is a high-level flow diagram illustrating a method for orchestrating network flow tracing within packet processing pipelines across multiple network appliances according to some aspects.

FIG. 19 is a high-level flow diagram illustrating a method for orchestrating network flow tracing within packet processing pipelines of multiple network appliances 1900 according to some aspects. After the start, at block 1901 the method can send a trace directive that indicates a network flow to a first network appliance that includes a first packet processing pipeline that includes a plurality of first appliance processing stages. At block 1902, the method can produce a trace report that indicates a network packet of the network flow, a first network rule that was applied to the network packet by a one of the first appliance processing stages, and the one of the first appliance processing stages that applied the first network rule to the network packet.

Figure 20:
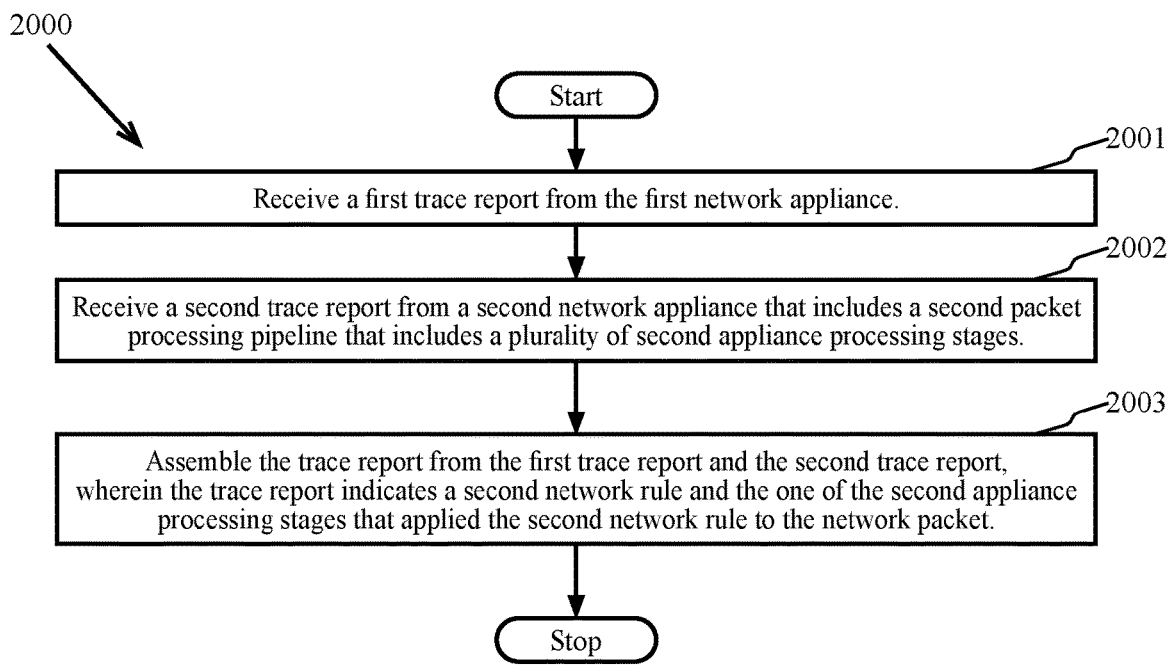
FIG. 20 is a high-level flow diagram illustrating a process assembling a trace report from the trace reports produced by multiple network appliances according to some aspects.

FIG. 20 is a high-level flow diagram illustrating a process assembling a trace report from the trace reports produced by multiple network appliances 2000 according to some aspects. After the start, at block 2001 the method can receive a first trace report from the first network appliance. At block 2002, the method can receive a second trace report from a second network appliance that includes a second packet processing pipeline that includes a plurality of second appliance processing stages. At block 2003, the method can assemble the trace report from the first trace report and the second trace report, wherein the trace report indicates a second network rule and the one of the second appliance processing stages that applied the second network rule to the network packet.

Figure 21:
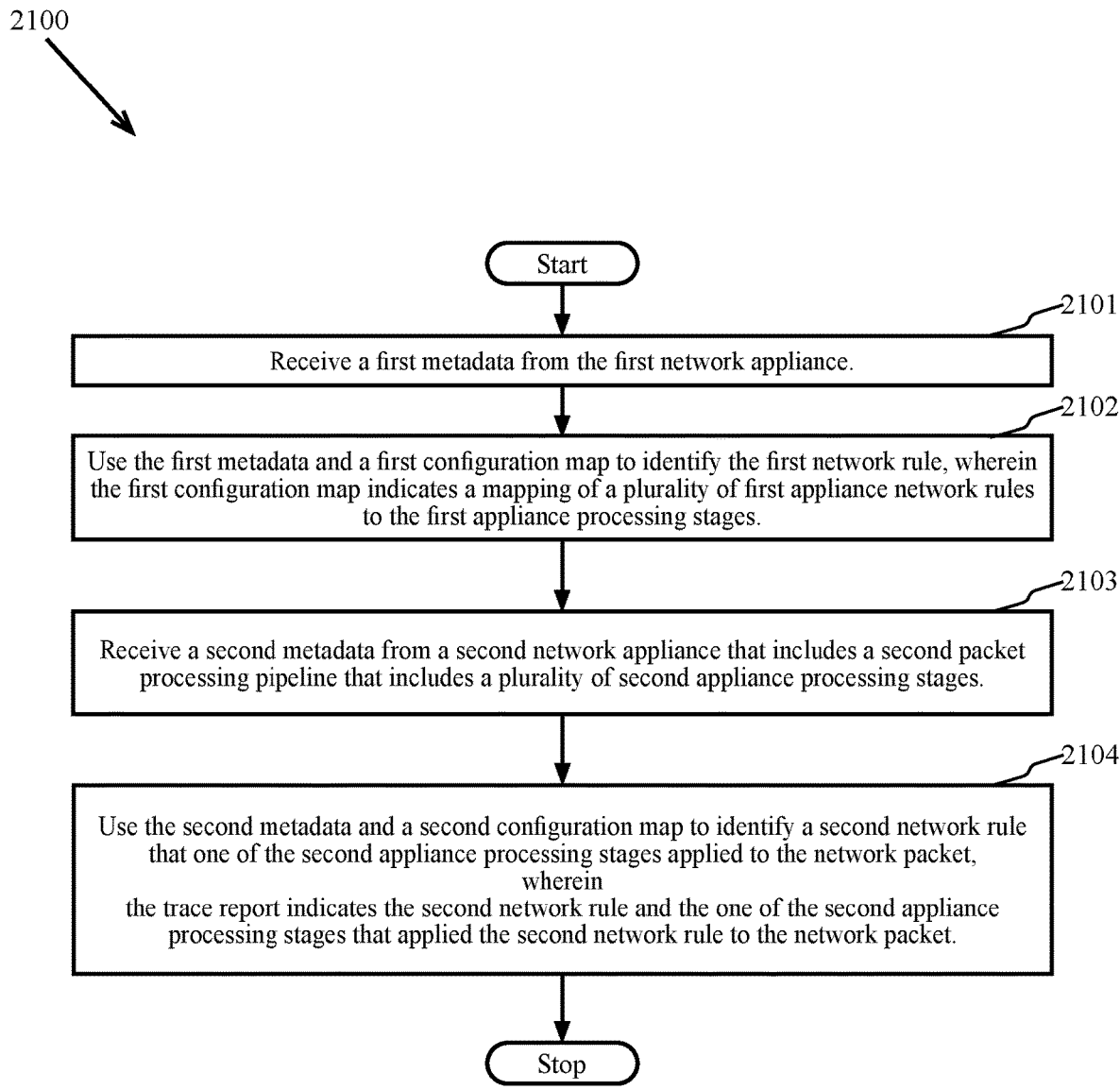
FIG. 21 is a high-level flow diagram illustrating a process assembling a trace report from the metadata produced by multiple network appliances according to some aspects.

FIG. 21 is a high-level flow diagram illustrating a process assembling a trace report from the metadata produced by multiple network appliances 2100 according to some aspects. After the start, at block 2101 the method can receive a first metadata from the first network appliance. At block 2102, the method can use the first metadata and a first configuration map to identify the first network rule, wherein the first configuration map indicates a mapping of a plurality of first appliance network rules to the first appliance processing stages. At block 2103, the method can receive a second metadata from a second network appliance that includes a second packet processing pipeline that includes a plurality of second appliance processing stages. At block 2104, the method can use the second metadata and a second configuration map to identify a second network rule that one of the second appliance processing stages applied to the network packet, wherein the trace report indicates the second network rule and the one of the second appliance processing stages that applied the second network rule to the network packet.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
receiving, from a network appliance, a configuration map that includes policy identifiers corresponding to hardware identifiers and network rules, the policy identifiers identifying policies implemented by match-action stages in packet processing pipeline circuitry in the network appliance, the hardware identifiers identifying the match-action stages; and
using the configuration map, one of the hardware identifiers, and one of the policy identifiers to identify one of the network rules in response to receiving metadata that includes the one of the hardware identifiers and the one of the policy identifiers,
wherein:
the network appliance includes a control plane configured to compile the network rules to produce the configuration map and to produce configuration data, the configuration data including the policies corresponding to the hardware identifiers; and
the control plane is configured to use the configuration data to configure the match-action stages to implement the policies by configuring each match-action stage identified by a hardware identifier to implement the policies corresponding to the hardware identifier in the configuration data.

2. The method of claim 1, wherein:
the metadata indicates that the one of the match-action stages identified by the one of the hardware identifiers implemented the one of the policies identified by the one of the policy identifiers to process a network jacket.

3. The method of claim 1,
wherein:
the one of the hardware identifiers and the one of the policy identifiers are both required for using the configuration map to identify the one of the network rules.

4. The method of claim 3, further including:
storing a second configuration map, the second configuration map including a second policy identifier corresponding to a network rule and corresponding to a second hardware identifier that identifies a second match-action stage of a second packet processing pipeline circuitry; and
identifying a second network rule in response the receiving a second metadata that includes the second policy identifier and the second hardware identifier.

5. The method of claim 1, further including:
producing a trace report that includes a packet 5-tuple of a network packet processed by the network appliance and indicates the one of the match-action stages that processed the network packet in accordance with the one of the network rules.

6. The method of claim 5, wherein the network packet is a debug packet generated by the network appliance in response to receiving a trace directive.

7. The method of claim 6, wherein:
the trace report further indicates that a second match-action stage of a second packet processing pipeline circuitry of a second network appliance processed the debug packet in accordance with a second network rule.

8. The method of claim 7, wherein:
the debug packet is transmitted to a third network appliance; and
the trace report does not indicate a processing stage of a third packet processing pipeline of the third network appliance.

9. The method of claim 8, wherein the trace report indicates that the third network appliance processed the debug packet.

10. The method of claim 8, wherein the trace report indicates that the network packet passed from the network appliance to the third network appliance and from the third network appliance to the second network appliance.

11. The method of claim 8, wherein the third network appliance is configured to drop the debug packet.

12. The method of claim 2, wherein:
the packet processing pipeline circuitry includes a parser configured to produce a packet header vector in response to receiving the network packet; and
the packet processing pipeline circuitry is configured to add the metadata to packet header vector of the network packet.

13. A system comprising:
a memory configured to store a configuration map that includes policy identifiers corresponding to network rules and hardware identifiers, the policy identifiers identifying policies implemented by match-action stages in packet processing pipeline circuitry in a network appliance, the hardware identifiers identifying the match-action stages; and
a report assembler configured to, in response to receiving a metadata including one of the policy identifiers and one of the hardware identifiers, use the configuration map and the metadata to identify one of the network rules,
wherein:
the network appliance includes a control plane configured to compile the network rules to produce the configuration map and to produce configuration data, the configuration data including the policies implemented by the match-action stages corresponding to the hardware identifiers of the match-action stages; and
the control plane is configured to use the configuration data to configure the match-action stages to implement the policies by configuring each match-action stage identified by a hardware identifier to implement the policies corresponding to the hardware identifier in the configuration data.

14. The system of claim 13, wherein:
the memory is configured to store a second configuration map produced by a second network appliance, the second network appliance including a second match-action stage in a second packet processing pipeline circuitry; and
the report assembler is configured to, in response to receiving a second metadata including a second policy identifier and a second hardware identifier, use the second configuration map and the second metadata to determine that the second packet processing pipeline circuitry processed a second network packet by implementing a second network rule.

15. The system of claim 13 further including a trace orchestrator that is configured to:
send a plurality of trace directives to a plurality of network appliances in response to receiving a flow trace instruction that indicates a network flow,
wherein:
in response to receiving one of the trace directives, the packet processing pipeline circuitry is configured to produce the metadata.

16. The system of claim 15 wherein:
the memory is configured to store configuration maps for the network appliances; and
the report assembler is configured to, in response to receiving additional metadata from the network appliances, use the configuration maps and the additional metadata to identify additional network rules that the network appliances applied to a plurality of network packets.

17. The system of claim 16, wherein the report assembler is configured to:
use hardware identifiers and policy identifiers in the additional metadata to identify the network rules.

18. The system of claim 13, wherein:
the packet processing pipeline circuitry includes a parser configured to produce a packet header vector by parsing a network packet;
the one of the match-action stages is configured to process the network packet by applying the one of the policies to the packet header vector; and
the packet processing pipeline circuitry is configured to add the metadata to the packet header vector.

* * * * *